United States Patent
Nakaoku et al.

(10) Patent No.: US 12,311,472 B2
(45) Date of Patent: May 27, 2025

(54) MACHINING HEAD AND THREE-DIMENSIONAL LASER PROCESSING MACHINE USING THE MACHINING HEAD

(71) Applicant: Mitsubishi Electric Corporation, Tokyo (JP)

(72) Inventors: Hiroshi Nakaoku, Tokyo (JP); Akinori Nishio, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 863 days.

(21) Appl. No.: 17/605,014

(22) PCT Filed: Mar. 16, 2020

(86) PCT No.: PCT/JP2020/011459
§ 371 (c)(1),
(2) Date: Oct. 20, 2021

(87) PCT Pub. No.: WO2020/246107
PCT Pub. Date: Dec. 10, 2020

(65) Prior Publication Data
US 2022/0212292 A1 Jul. 7, 2022

(30) Foreign Application Priority Data
Jun. 3, 2019 (JP) .................. 2019-103851

(51) Int. Cl.
*B23K 26/70* (2014.01)
*B23K 26/08* (2014.01)

(52) U.S. Cl.
CPC ........ *B23K 26/702* (2015.10); *B23K 26/0884* (2013.01)

(58) Field of Classification Search
CPC . B23K 26/0884; B23K 26/702; B23K 37/006
(Continued)

(56) References Cited

FOREIGN PATENT DOCUMENTS

| CN | 203045163 | * | 7/2013 |
| CN | 203045163 U | * | 7/2013 |

(Continued)

OTHER PUBLICATIONS

International Search Report and Written Opinion mailed on Jun. 2, 2020, received for PCT Application PCT/JP2020/011459, Filed on Mar. 16, 2020, 9 pages including English Translation.

(Continued)

*Primary Examiner* — Vy T Nguyen
(74) *Attorney, Agent, or Firm* — XSENSUS LLP

(57) ABSTRACT

A machining head capable of coping with impacts from different directions with a simple configuration of one buffer, and a three-dimensional laser processing machine using the machining head. A machining head having a multi-axis structure that rotatably supports orientation of a tip that emits a laser beam used for a three-dimensional laser processing machine according to the present disclosure includes a buffer in an arm that forms a predetermined angle with a direction in which a laser beam is emitted. The buffer includes: a first coupler that includes a first coupling surface provided near a tip; a second coupler that includes a second coupling surface facing the first coupling surface; and a coupling member that couples the first coupling surface and the second coupling surface 3*b*. When the tip is collided with a collision force, the first coupling surface and the second coupling surface are separated.

7 Claims, 18 Drawing Sheets

(58) Field of Classification Search
USPC .............................. 219/121.84, 121.6, 121.67
See application file for complete search history.

(56) References Cited

FOREIGN PATENT DOCUMENTS

JP          2009-698 A      1/2009
JP       2009000698     *  1/2009

OTHER PUBLICATIONS

Office Action issued Feb. 8, 2023 in Chinese Patent Application No. 202080039408.3 with computer-generated English translation, 27 pages.

\* cited by examiner

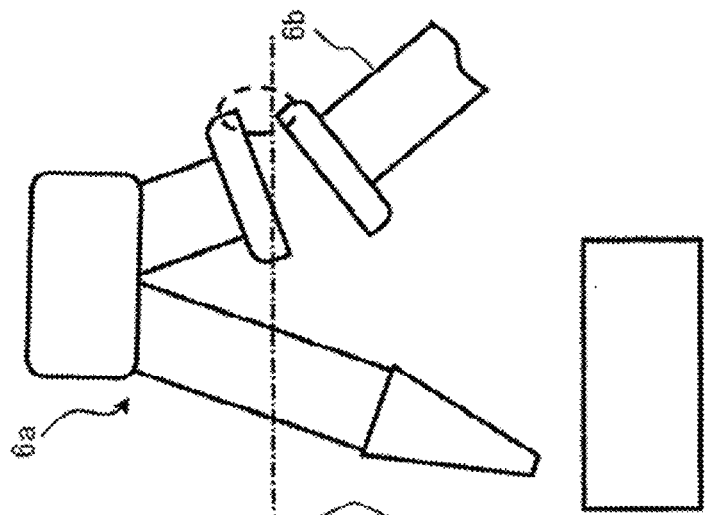
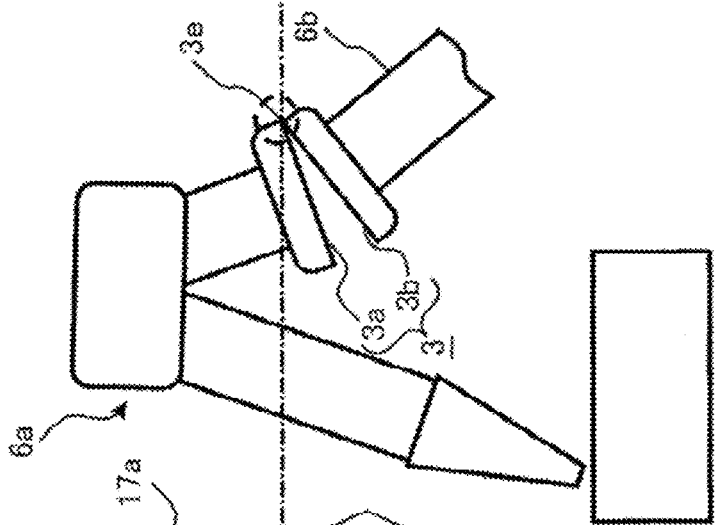
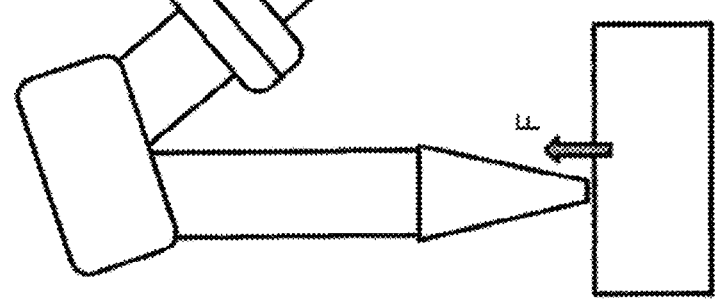

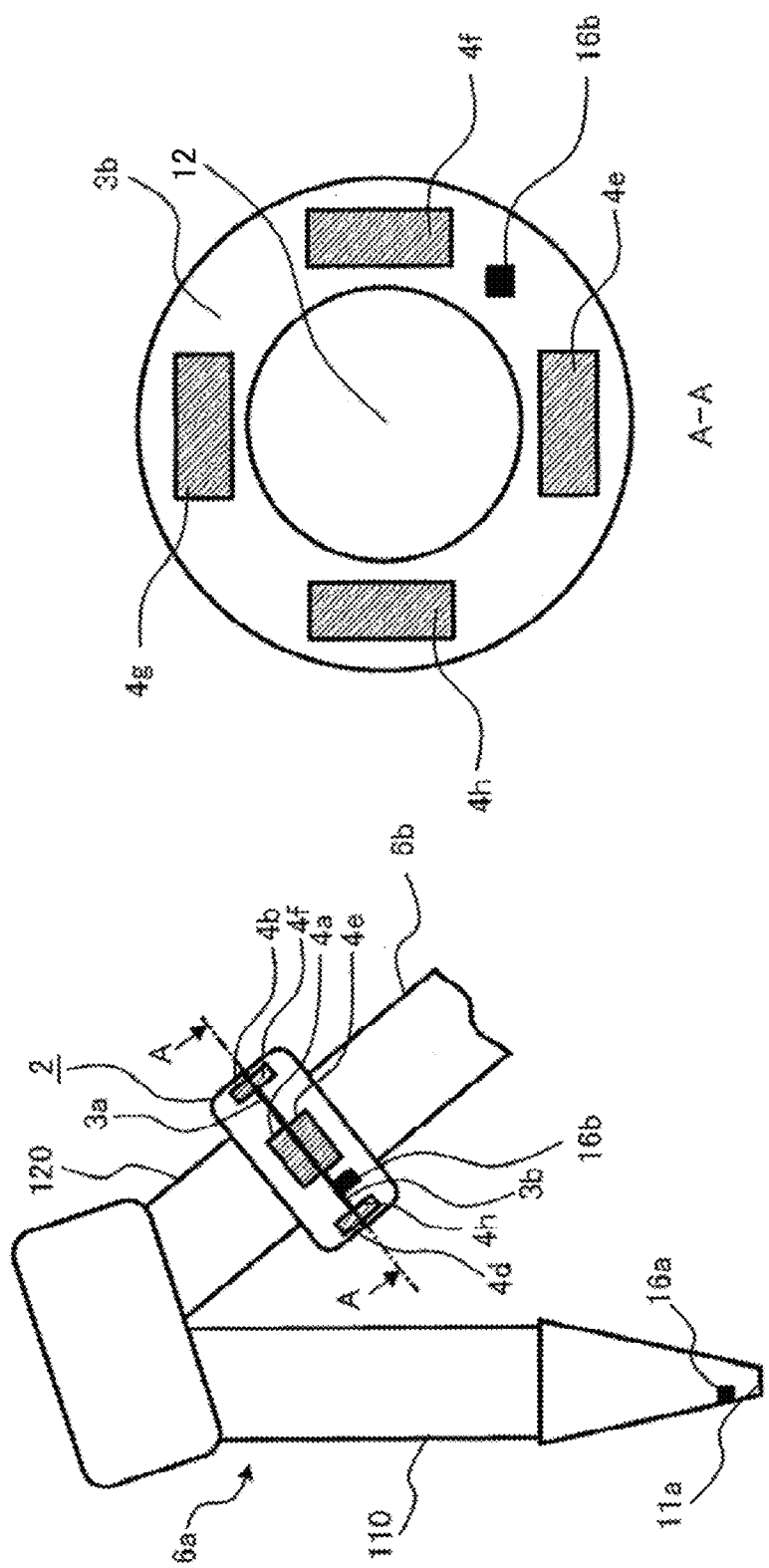

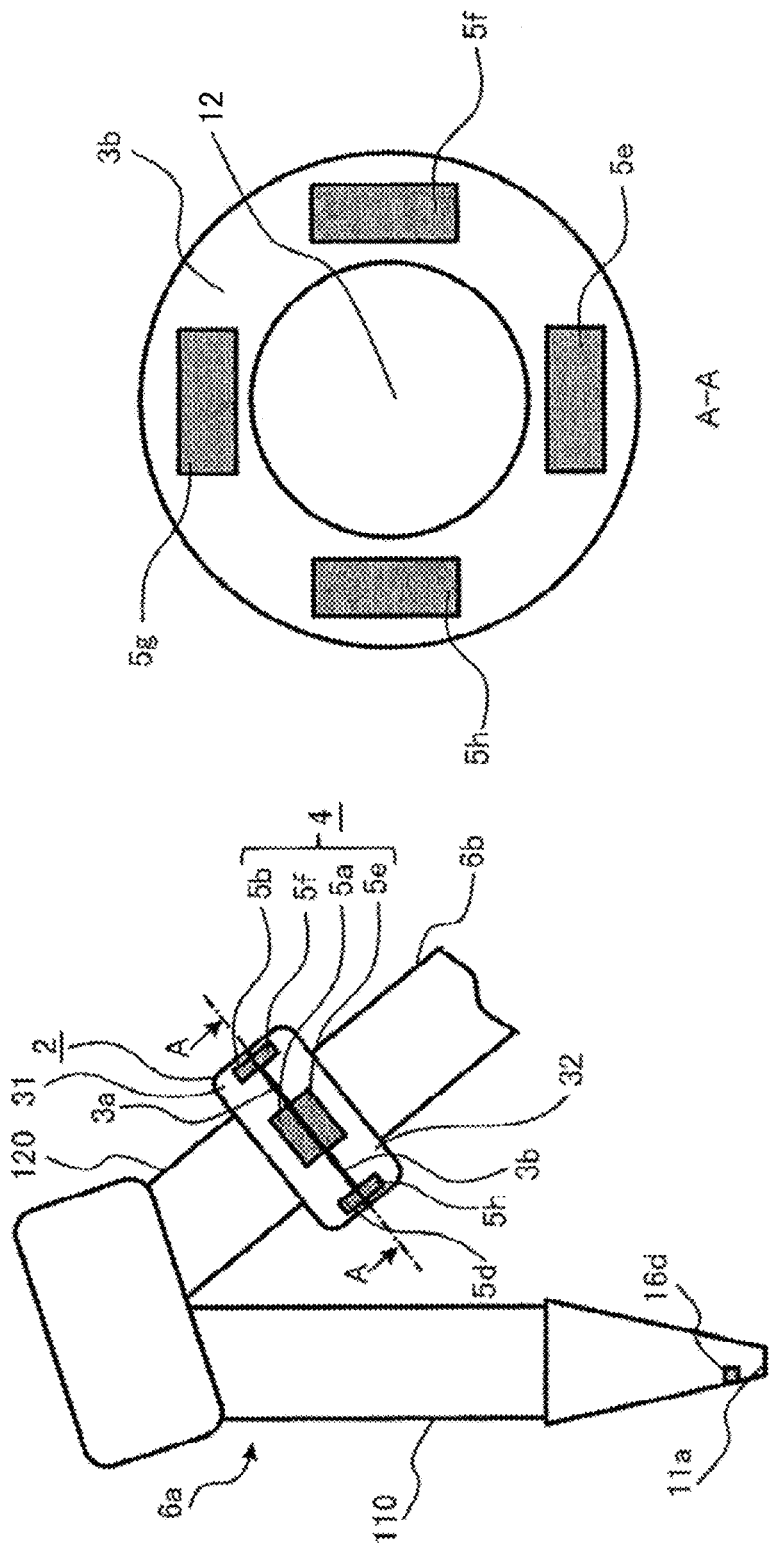

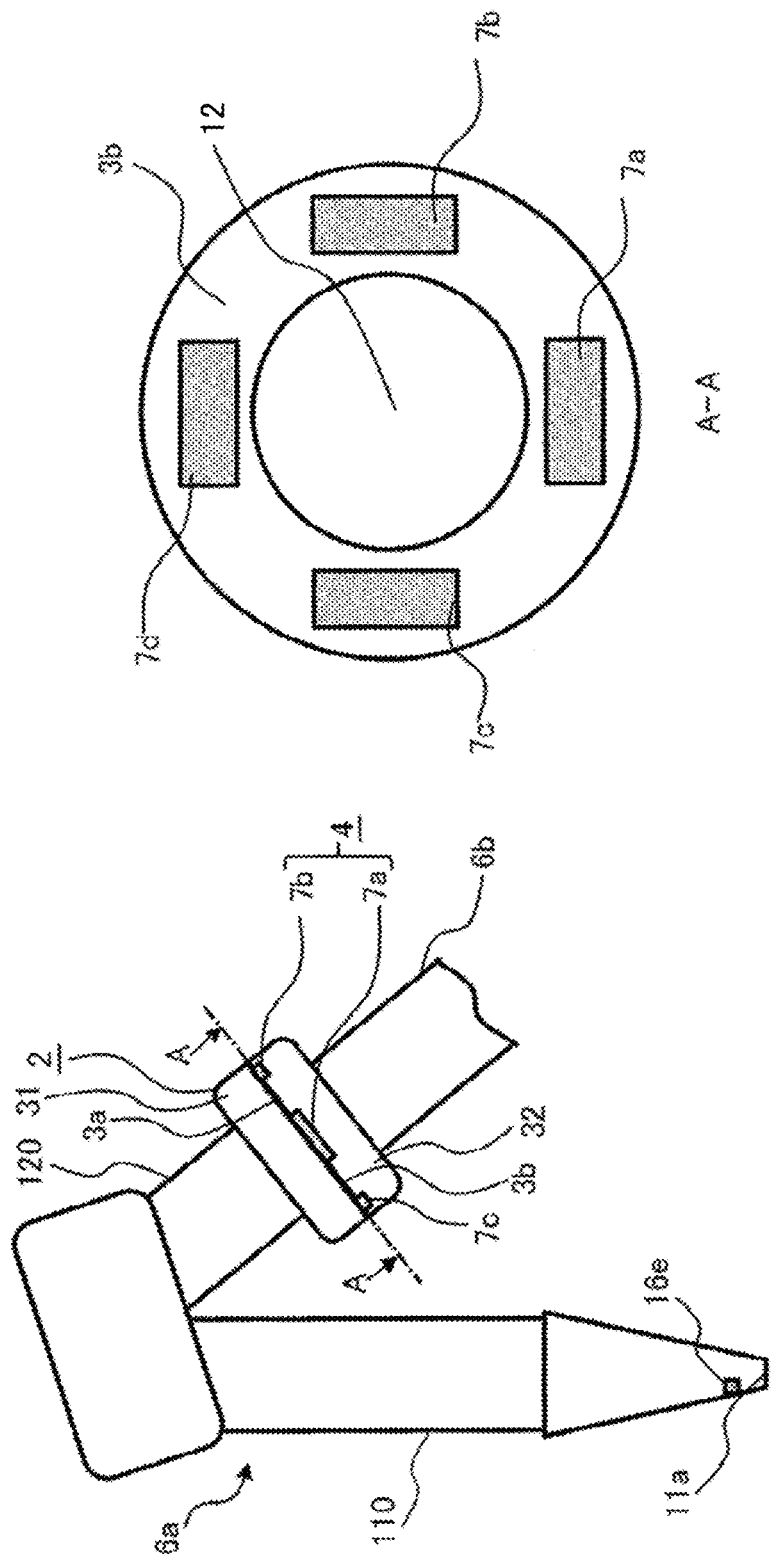

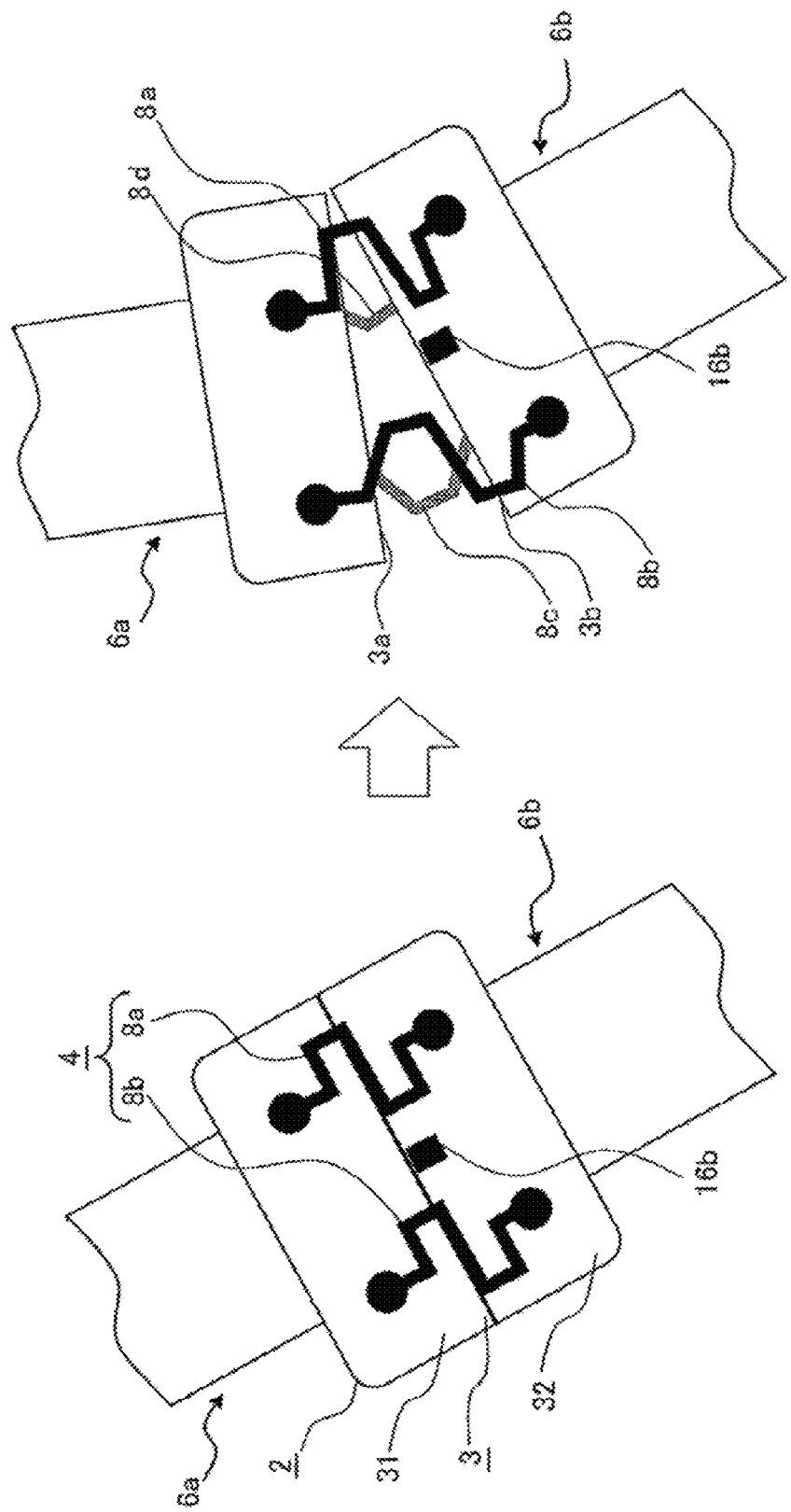

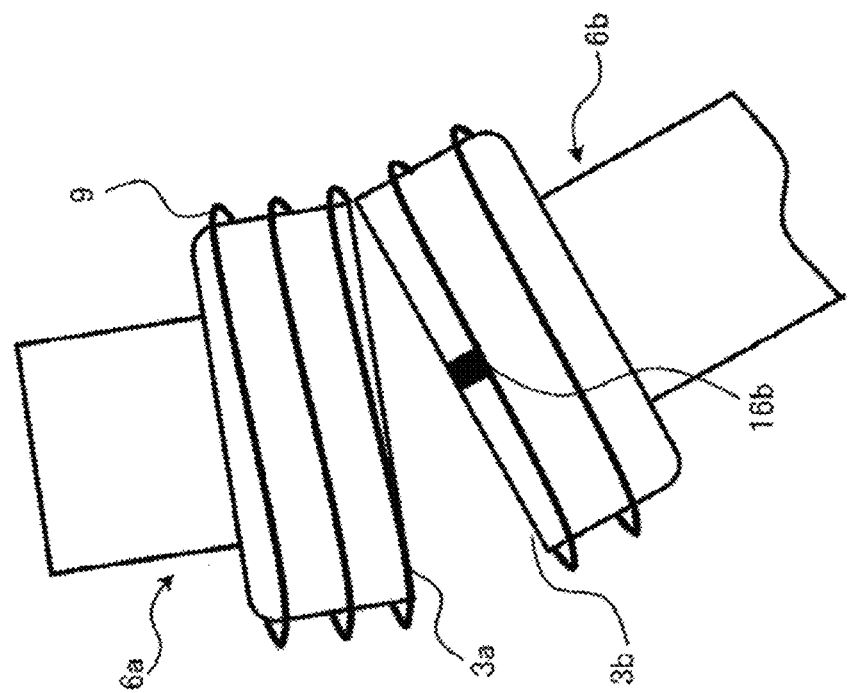
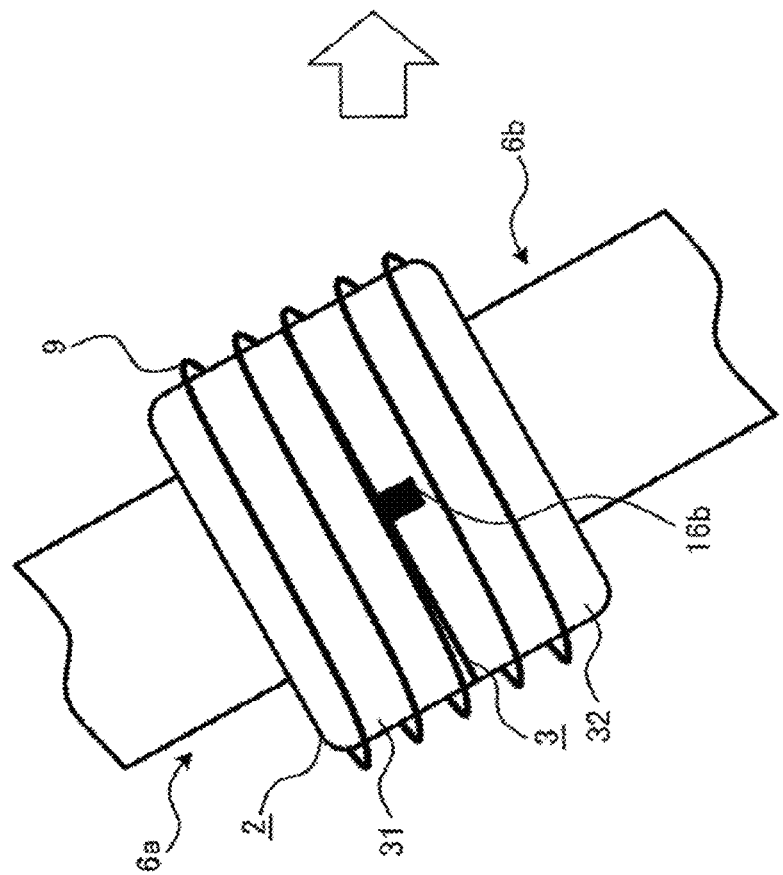

MACHINING HEAD AND THREE-DIMENSIONAL LASER PROCESSING MACHINE USING THE MACHINING HEAD

CROSS-REFERENCE TO RELATED APPLICATIONS

The present application is based on PCT filing PCT/JP2020/011459, filed Mar. 16, 2020, which claims priority to JP 2019-103851, filed Jun. 3, 2019, the entire contents of each are incorporated herein by reference.

FIELD

The present disclosure relates to a machining head having a multi-axis structure including two or more rotation axes, and a three-dimensional laser processing machine using the machining head.

BACKGROUND

With the development of laser technology, the performance of a laser processing machine has been dramatically improved. Accordingly, it is necessary to increase the operating speed of a machining head in order to increase the speed of laser processing. As a result, when the machining head and a workpiece collide with each other due to a mistake during a teaching operation, a programming mistake of a machining path, or the like, there is a high possibility that the device is greatly damaged. A prior art prevents damage to the entire head in the event of a collision by separating a part of the head or moving it in a direction away from an object with which the head has collided. For example, in Patent Literature 1, a buffer attached to a tip nozzle is provided with two buffer means in a perpendicular direction and a horizontal direction, and each buffer means operates depending on the direction of a collision. However, since the tip nozzle is provided with the two buffer means, there is a problem that the buffer is complex and heavy, and is not suitable for high-speed operation.

CITATION LIST

Patent Literature

Patent Literature 1: Japanese Patent Application Laid-open No. 2009-698

SUMMARY

Technical Problem

The present disclosure has been made to solve the above problem, and an object of the present disclosure is to provide a machining head capable of coping with impacts from different directions with a simple configuration of one buffer, and a three-dimensional laser processing machine using the machining head.

Solution to Problem

A machining head used for a three-dimensional laser processing machine according to the present disclosure has a multi-axis structure that rotatably supports orientation of a tip that emits a laser beam. The machining head includes a buffer installed in an arm that forms a predetermined angle with a direction in which the laser beam is emitted. The buffer includes: a first coupler that includes a first coupling surface provided near the tip; a second coupler that includes a second coupling surface facing the first coupling surface; and a coupling member to couple the first coupling surface and the second coupling surface. When a collision occurs at the tip, the first coupling surface and the second coupling surface are separated, and a separator ranging from the tip to the first coupling surface separates from a stationary body that is the arm on a side of the second coupling surface.

Advantageous Effects of Invention

According to the machining head and the three-dimensional laser processing machine using the machining head according to the present disclosure, a tip nozzle can be retreated in response to collisions from different directions by the simple configuration with one buffer, and damage to the machining head can be reduced.

BRIEF DESCRIPTION OF DRAWINGS

FIGS. 6A, 6B, and 6C are explanatory diagrams illustrating, in stages, a retreat operation of a separator in a case where the one-point oriented machining head of the three-dimensional laser processing machine according to the first embodiment collides downward.

FIGS. 9A and 9B are explanatory diagrams illustrating an example of a configuration of the buffer and a collision detection sensor, the buffer being installed in the arm of a one-point oriented machining head of the three-dimensional laser processing machine according to the second embodiment.

FIGS. 11A and 11B are explanatory diagrams illustrating the buffer using electromagnets that is installed in the arm of the one-point oriented machining head of the three-dimensional laser processing machine according to a third embodiment.

FIGS. 12A and 12B are explanatory diagrams illustrating the buffer using vacuum suckers that is installed in the arm of the one-point oriented machining head of the three-dimensional laser processing machine according to a fourth embodiment.

FIGS. 13A and 13B are explanatory diagrams illustrating the buffer using plastically deformable members and an operation of the buffer, the buffer being installed in the arm of the one-point oriented machining head of the three-dimensional laser processing machine according to a fifth embodiment.

FIGS. 14A and 14B are explanatory diagrams illustrating the buffer using a coil spring and an operation of the buffer, the buffer being installed in the arm of the one-point oriented machining head of the three-dimensional laser processing machine according to a sixth embodiment.

DESCRIPTION OF EMBODIMENTS

Figure 1:
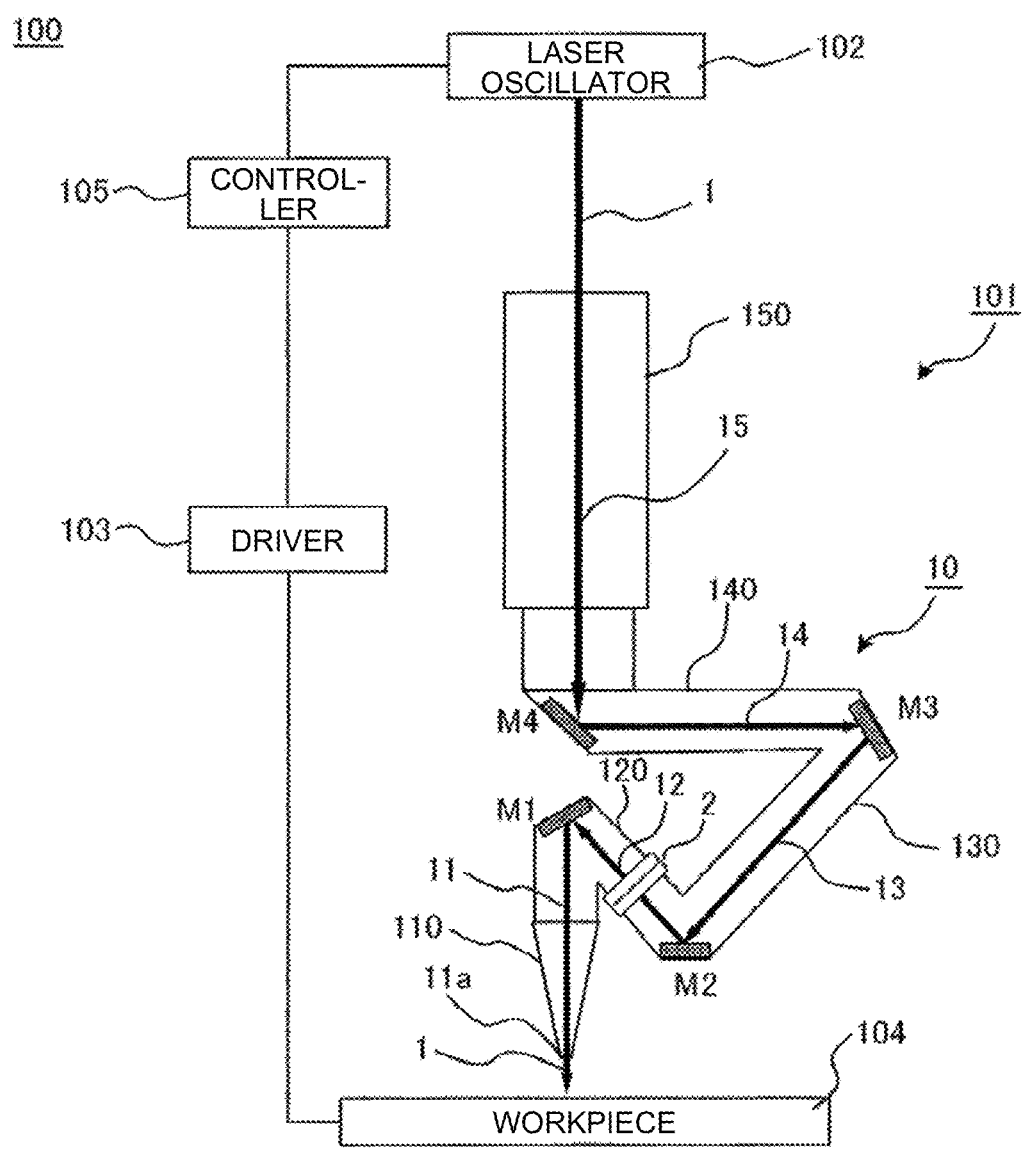
FIG. 1 is a block diagram illustrating a configuration of a three-dimensional laser processing machine according to a first embodiment.

Hereinafter, embodiments according to the present disclosure will be described with reference to the drawings. Note that in the following embodiments, similar components are denoted by the same reference numerals.

First Embodiment

FIG. 1 is a block diagram illustrating an example of a configuration of a three-dimensional laser processing machine 100 according to a first embodiment.

Figure 2:
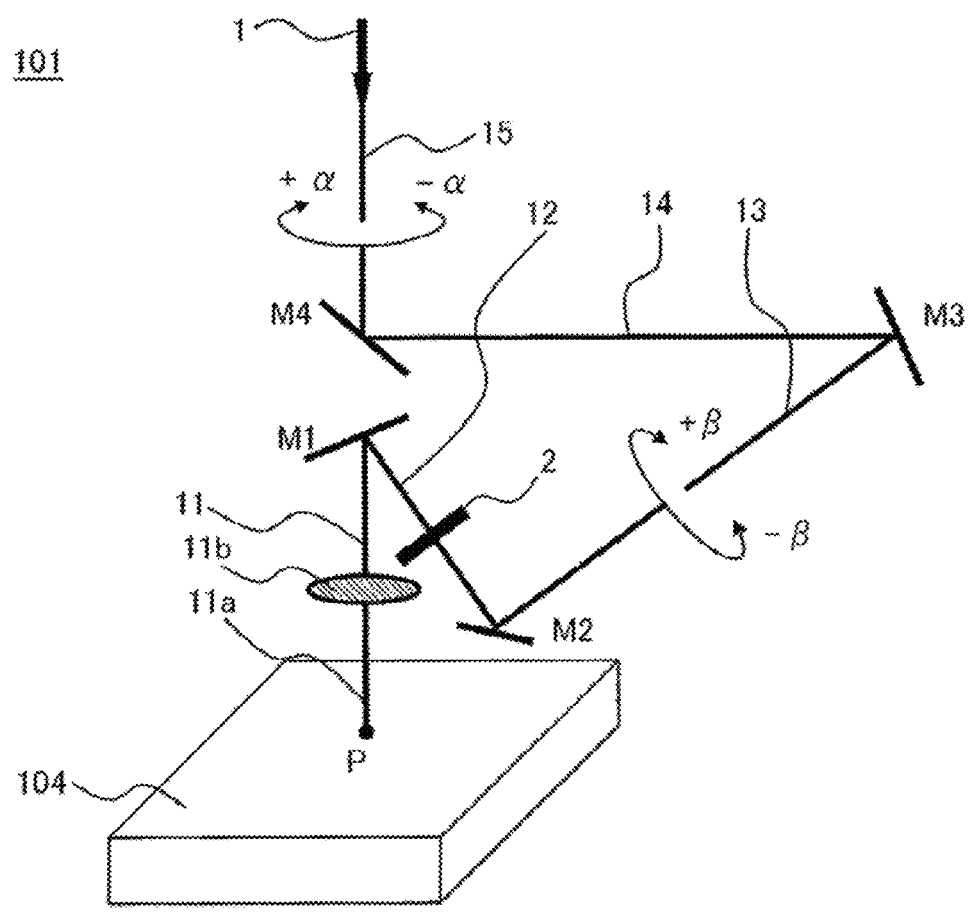
FIG. 2 is an explanatory diagram illustrating a one-point oriented machining head of the three-dimensional laser processing machine according to the first embodiment, and a state in which a buffer is installed in the machining head.

FIG. 2 is an explanatory diagram illustrating a one-point oriented machining head of the three-dimensional laser processing machine 100 according to the first embodiment, and a state in which a buffer is installed in the machining head.

Figure 3:
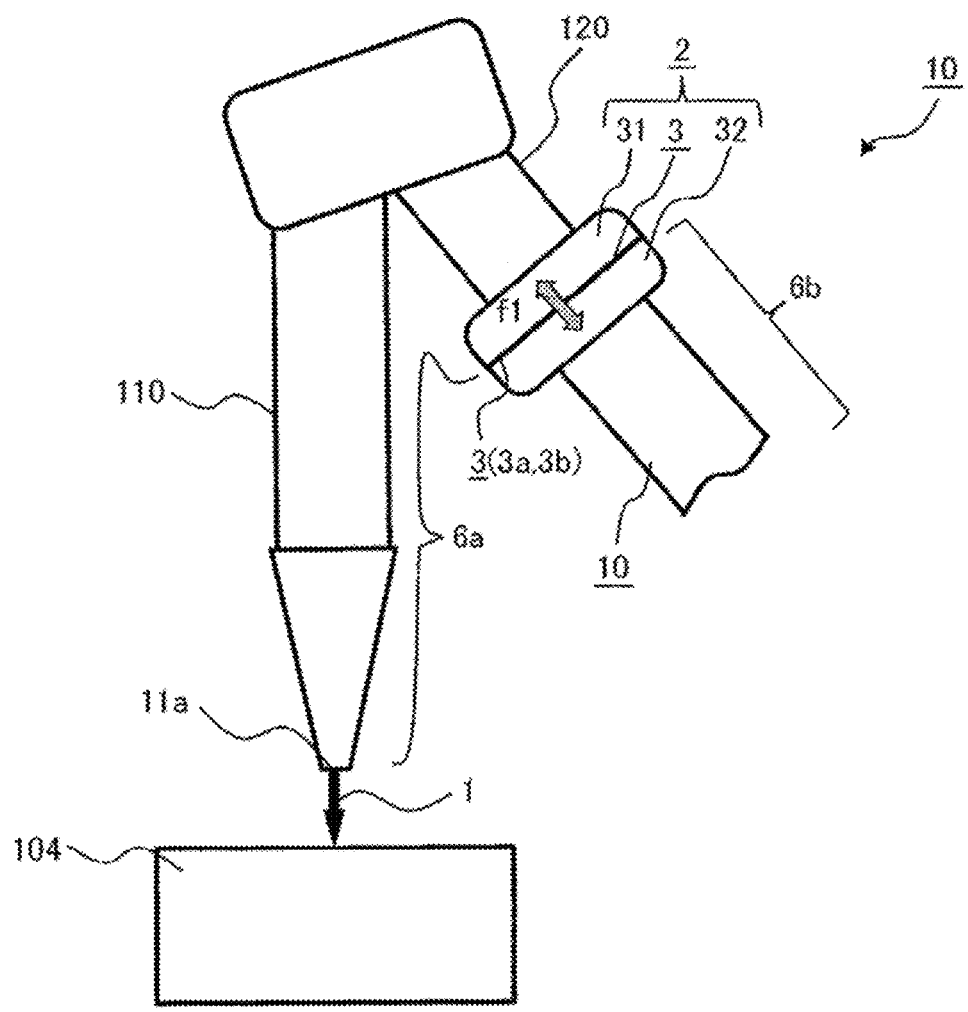
FIG. 3 is a diagram illustrating the buffer installed in an arm of the one-point oriented machining head of the three-dimensional laser processing machine according to the first embodiment.

FIG. 3 is a diagram illustrating the buffer installed in an arm of the one-point oriented machining head of the three-dimensional laser processing machine 100 according to the first embodiment.

The three-dimensional laser processing machine 100 according to the first embodiment illustrated in FIG. 1 includes: a machining head 101 of a one-point oriented type that irradiates an object to be machined with a laser beam 1; a laser oscillator 102 that oscillates the laser beam 1 to be emitted to the machining head 101; a driver 103 that drives the machining head 101 and a workpiece 104; and a controller 105 that controls energy of the laser beam 1 and also controls the machining head 101 and the driver 103.

The one-point oriented machining head is a machining head having a multi-axis structure that controls a plurality of rotation axes along an optical path through which the laser beam is transmitted to rotatably support the orientation of a tip from which the laser beam is emitted, and is installed in the three-dimensional laser processing machine to enable high-speed machining. This one-point oriented machining head has a characteristic that a machining point does not move at the time of rotating the rotation axis in the optical path through which the laser beam is sequentially reflected by a plurality of mirrors and transmitted. As illustrated in FIG. 1, the laser beam 1 oscillated from the laser oscillator 102 is introduced into the machining head 101 of the one-point oriented type. The machining head 101 of the one-point oriented type has a structure of five axes including: a first optical axis 11 from a tip 11a, which is an emission port from which the laser beam 1 is emitted, to a mirror M1; a second optical axis 12 from the mirror M1 to a mirror M2; a third optical axis 13 from the mirror M2 to a mirror M3; a fourth optical axis 14 from the mirror M3 to a mirror M4; and a fifth optical axis 15 from the mirror M4 to the incident side of the laser beam. A tip nozzle 110 that emits the laser beam 1 includes a first optical axis 11. An incident portion 150 on which the laser beam 1 is incident includes the fifth optical axis 15. The incident portion 150 is a portion before the laser beam 1 is reflected by the mirror M4.

An arm 10 is connected to the tip nozzle 110, and includes a first arm 120, a second arm 130, and a third arm 140 including the second optical axis 12, the third optical axis 13, and the fourth optical axis 14, respectively. Each of the second optical axis 12, the third optical axis 13, and the fourth optical axis 14 forms a predetermined angle with a direction in which the laser beam 1 is emitted. That is, regarding the optical axis, three optical axes are provided between the first optical axis 11 and the fifth optical axis 15, the three optical axes being the second optical axis 12, the third optical axis 13, and the fourth optical axis 14 each forming the predetermined angle with the direction in which the laser beam 1 is emitted. As for the arm 10, the first arm 120, the second arm 130, and the third arm 140 each forming the predetermined angle with the direction in which the laser beam 1 is emitted are provided between the tip nozzle 110 and the incident portion 150. As illustrated in FIG. 2, the laser beam 1 is reflected by the plurality of mirrors M4, M3, M2, and M1 in this order along the optical path through which the laser beam 1 is transmitted, is condensed by a condensing mechanism 11b such as a lens provided in the tip nozzle 110 including the tip 11a, is emitted from the tip 11a, and reaches the workpiece 104.

Next, a rotation axis and an attitude axis of the machining head 101 of the one-point oriented type will be described with reference to FIGS. 1 and 2. The incident portion 150 is rotatable in a direction of an arrow +α (clockwise direction in the drawing) or −α (counterclockwise direction in the drawing) around the fifth optical axis 15. Therefore, the fifth optical axis 15 is a rotation axis that can rotate a portion of and below the mirror M4 of the machining head 101 (that is, the fourth optical axis 14, the third optical axis 13, the second optical axis 12, and the first optical axis 11). The second arm 130 is rotatable in a direction of an arrow +β (clockwise direction in the drawing) or −β (counterclockwise direction in the drawing) around the third optical axis 13. Therefore, the third optical axis 13 is an attitude axis that can rotate a portion of and below the mirror M2 (that is, the second optical axis 12 and the first optical axis 11). The direction in which the laser beam 1 is emitted is changed by the rotation of the attitude axis.

Note that the machining head of the one-point oriented type according to the first embodiment has an optical system configuration in which the laser beam is transmitted by the plurality of mirrors, but a transmission optical system using an optical fiber can also be configured using a one-point oriented machining head including an arm. When a transmission optical system using an optical fiber is used, the first optical axis 11 corresponds to a first drive axis which is an optical fiber drive axis on the emission side of the laser beam, and the second optical axis 12, the third optical axis 13, the fourth optical axis 14, and the fifth optical axis 15 correspond to a second drive axis, a third drive axis, a fourth drive axis, and a fifth drive axis that are sequentially connected to the first drive axis of the optical fiber, respectively. As illustrated in FIG. 2, extensions of the fifth optical axis 15, which is the rotation axis of the one-point oriented machining head, and the third optical axis 13, which is the attitude axis thereof, are designed to always intersect at a point P, and this point P is generally the machining point. Regardless of the rotational positions of the rotation axis and the attitude axis, this machining point can always be irradiated with the laser beam. According to the three-dimensional laser processing machine having such a structure of the machining head of the one-point oriented type, the workpiece 104 can be irradiated with the laser from various directions by operating the rotation axis and the attitude axis. In general, laser irradiation is often performed such that a surface of the workpiece 104 and the direction of incidence of the laser are perpendicular to each other in accordance with the shape of the workpiece 104. At that time, an operator needs to manually perform teaching in order to set an irradiation direction at each irradiation position of the laser. During the teaching operation and machining, the machining head and the workpiece may collide with each other due to an operation error by the operator, a difference between the actual shape of the workpiece and the drawing, or the like.

In the three-dimensional laser processing machine 100 according to the first embodiment, a buffer 2 is installed in order to prevent serious damage to the machining head 101 and the workpiece 104 in the event of a collision of the tip 11a of the machining head 101 of the one-point oriented type. As illustrated in FIGS. 1 and 2, the buffer 2 is installed in the arm 10. Specifically, the buffer 2 is installed in the arm 10 between the mirror M1 and the mirror M2, that is, in the first arm 120 including the second optical axis 12 which is the optical axis closest to the first optical axis 11. Note that, in the one-point oriented machining head using the transmission optical system with an optical fiber, the arm includes a first arm including the second drive axis that forms a predetermined angle with a tip nozzle including the first drive axis on the emission side of the laser beam, a second arm including the third drive axis, and a third arm including the fourth drive axis. The third drive axis is an attitude axis capable of rotating the second drive axis and the first drive axis. Even in the one-point oriented machining head using the transmission optical system with an optical fiber, it is preferable that the buffer 2 is installed in the arm, specifically in the first arm in the arm including the second drive axis that is the drive axis closest to the first drive axis.

Next, the buffer 2 will be described.

FIG. 3 illustrates an external structure of the buffer 2 installed in the arm 10. The buffer 2 is installed in the first arm 120 closest to the tip nozzle 110. The buffer 2 includes a first coupler 31 and a second coupler 32, and is provided with a coupling member 4 (not illustrated but described below) that couples the first coupler 31 and the second coupler 32. The first coupler 31 includes a first coupling surface 3a and is provided near the tip nozzle 110 including the tip 11a that emits the laser beam 1. The second coupler 32 includes a second coupling surface 3b facing the first coupling surface 3a. That is, in the buffer 2, the first coupler 31 including the first coupling surface 3a is closer to the side of the mirror M1 on the emission side of the laser beam illustrated in FIG. 1, and the second coupler 32 including the second coupling surface 3b is closer to the side of the mirror M2. The coupling member 4 is provided on at least one of the first coupler 31 and the second coupler 32, and couples two coupling surfaces 3 being the first coupling surface 3a and the second coupling surface 3b. In addition, a portion from the first coupling surface 3a to the tip 11a along a direction of travel of the laser beam 1 is referred to as a separator 6a, and a portion of the arm 10 on the side of the second coupling surface 3b along a direction "d" opposite to the direction of travel of the laser beam 1 is referred to as a stationary body 6b. During normal operation, the first coupling surface 3a and the second coupling surface 3b are coupled by a coupling force f1 by the coupling member 4. In a case where the tip 11a collides with a collision force F, the first coupling surface 3a and the second coupling surface 3b are separated so that the separator 6a separates from the stationary body 6b and retreats from an object with which the tip has collided.

Figure 4A:
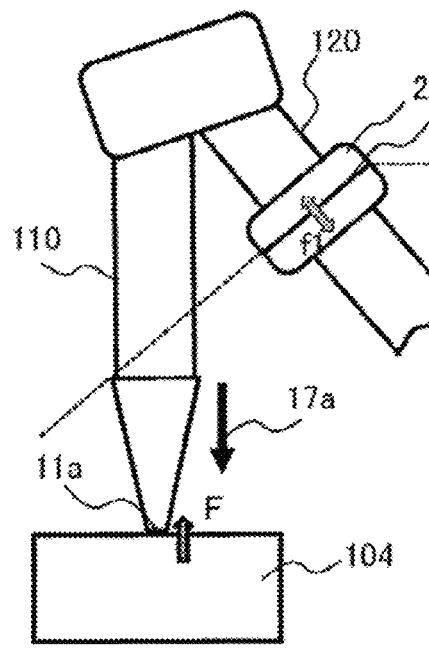
FIGS. 4A, 4B, and 4C are explanatory diagrams illustrating an example of a retreat operation of the buffer installed in the arm immediately after a tip of the one-point oriented machining head of the three-dimensional laser processing machine according to the first embodiment collides with a workpiece below.
Figure 4B:
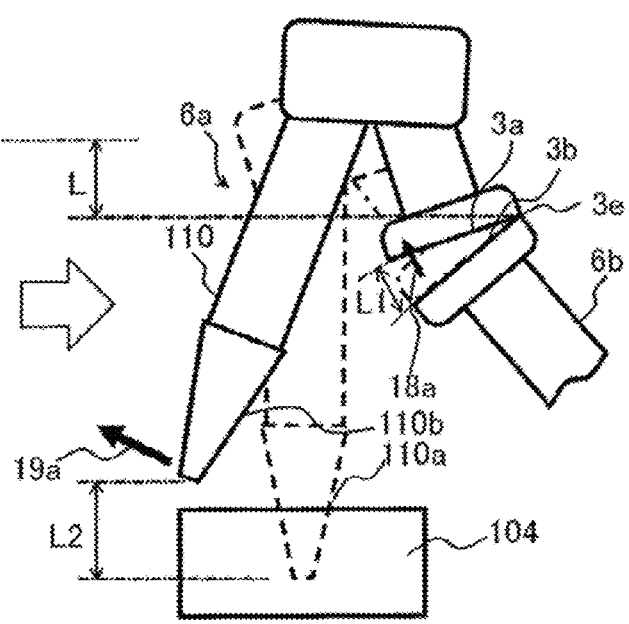
Figure 4C:
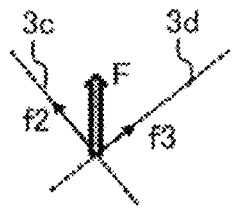
Figure 5A:
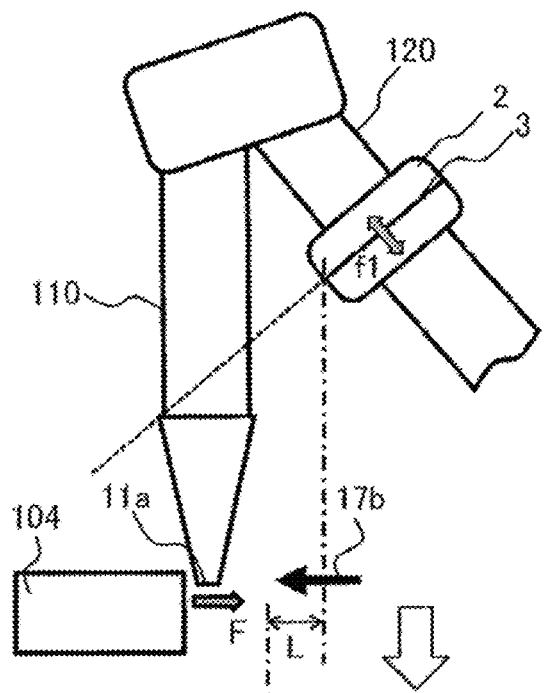
FIGS. 5A, 5B, and 5C are explanatory diagrams illustrating an example of a retreat operation of the buffer installed in the arm immediately after the tip of the one-point oriented machining head of the three-dimensional laser processing machine according to the first embodiment collides with a workpiece on a left side.
Figure 5C:
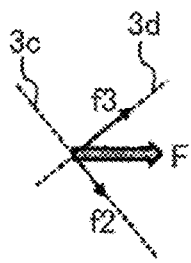
Figure 5B:
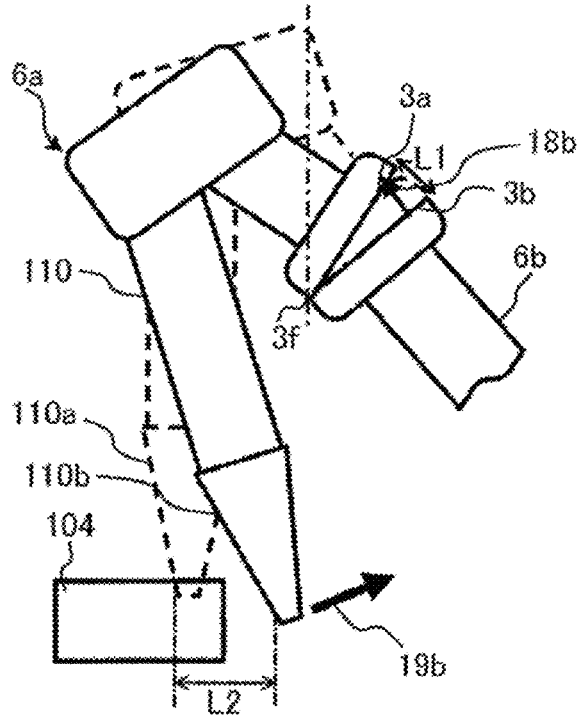

Next, a retreat operation of the buffer 2 will be described. FIGS. 4A, 4B, and 4C are explanatory diagrams illustrating an example of the retreat operation of the buffer 2 installed in the arm 10 immediately after the tip 11a of the one-point oriented machining head of the three-dimensional laser processing machine according to the first embodiment collides with the workpiece 104 below. FIGS. 5A, 5B, and 5C are explanatory diagrams illustrating an example of the retreat operation of the buffer 2 installed in the arm 10 immediately after the tip 11a of the one-point oriented machining head of the three-dimensional laser processing machine according to the first embodiment collides with the workpiece 104 on a left side.

FIG. 4A illustrates a situation when the machining head 101 operates in the direction of an arrow 17a, that is, in a vertically downward direction, and the tip 11a of the machining head 101 collides with the workpiece 104 below in the drawing with the collision force F, which occurs most frequently. The machining head 101 continues to move in the direction of the arrow 17a until the operation is stopped by a stop command of the controller 105. The distance of travel of the machining head 101 in a vertical direction from FIG. 4A to FIG. 4B corresponds to "L". In this case, as illustrated in FIG. 4C, the collision force F can be broken down into a component force f2 of the collision force acting in a perpendicular direction 3c of the second coupling surface 3b on the side of the stationary body 6b, and a component force f3 of the collision force acting in a parallel direction 3d of the second coupling surface 3b. As illustrated in FIG. 4A, the first coupling surface 3a and the second coupling surface 3b of the buffer 2 are coupled by the coupling force f1 during normal operation. Immediately after the collision, as illustrated in FIG. 4B, a moment acts about a coupling surface fulcrum 3e of the buffer 2 on a side away from the tip nozzle 110, so that the first coupling surface 3a and the second coupling surface 3b are separated in the direction of an arrow 18a by the action of the component force f2 of the collision force smaller than the coupling force f1. This means that the tip 11a retreats from the workpiece 104 in the direction of an arrow 19a.

FIG. 5A illustrates a situation when the machining head 101 operates in the direction of an arrow 17b, that is, leftward in the drawing, and the tip 11a of the machining head 101 collides with the workpiece 104 on the left side in the drawing with the collision force F. The machining head 101 continues to move in the direction of the arrow 17b until the operation is stopped by a stop command of the controller 105. The distance of travel of the machining head 101 in a horizontal direction from FIG. 5A to FIG. 5B corresponds to "L". In this case, as illustrated in FIG. 5C, the collision force F can be broken down into the component force f2 of the collision force acting in the perpendicular direction 3c of the second coupling surface 3b on the side of the stationary body 6b, and the component force f3 of the collision force acting in the parallel direction 3d of the second coupling surface 3b. The first coupling surface 3a and the second coupling surface 3b of the buffer 2 are coupled by the coupling force f1 during normal operation. Immediately after the collision, as illustrated in FIG. 5B, a moment acts about a coupling surface fulcrum 3f of the buffer 2 on a side close to the tip nozzle 110, so that the first coupling surface 3a and the second coupling surface 3b are separated in the direction of an arrow 18b by the action of the component force f2 of the collision force smaller than the coupling force f1. This means that the tip 11a retreats from the workpiece 104 in the direction of an arrow 19b.

Here, since the retreat is possible in response to a smaller collision force, it is preferable to set the coupling force f1 to be small. Meanwhile, in order to prevent the two coupling surfaces 3 from being separated at an unintended timing, the coupling force f1 is set to a value larger than a product of multiplication of the weight of the separator 6a and the acceleration during the operation of the machining head 101. In the first embodiment, the buffer 2 is installed in the first arm 120 adjacent to the tip nozzle 110 in the arm 10 with the first arm 120 having a small diameter as with the tip nozzle 110, whereby the weight of the buffer 2 can be reduced. Furthermore, since the weight of the separator 6a is small, the coupling force f1 can be set small. As a result, the two coupling surfaces 3 can be separated even in response to a smaller collision force, and the tip nozzle 110 can be retreated from the collision.

Also, as illustrated in FIGS. 4A, 4B, 4C and FIGS. 5A, 5B, 5C, when the machining head 101 collides, the first coupling surface 3a and the second coupling surface 3b of the buffer 2 are separated from each other by a separation distance of "L1" in the perpendicular direction of the second coupling surface 3b. In this case, the tip nozzle 110 retreats from a temporary position 110a (illustrated by a broken line) of the moving tip nozzle 110 to a retreat position 110b (illustrated by a solid line) of the tip nozzle 110 with a retreat distance of the tip 11a being "L2". Here, the retreat distance L2 of the tip 11a is a distance in the vertical direction in FIGS. 4A, 4B, 4C and in the horizontal direction in FIG. 5 FIGS. 5A, 5B, 5C. Note that FIGS. 4A, 4B, 4C and FIGS. 5A, 5B, 5C illustrate the examples of the operation when the collision occurs with the workpiece 104 below and on the left side, respectively. Here, depending on the direction of the collision force F, the first coupling surface 3a and the second coupling surface 3b are separated from each other with one point on the outer periphery of the second coupling surface 3b as a fulcrum to cause separation of the separator 6a, or are slid away without a fulcrum to cause separation of the separator 6a. In either case, the tip nozzle 110 can be retreated from the collision.

FIGS. 6A, 6B, 6C illustrates the operation of the machining head 101 in three stages in the event of the collision from below as illustrated in FIGS. 4A, 4B, 4C. FIG. 6A illustrates a state in a first stage immediately before the collision, FIG. 6B illustrates a state in a second stage immediately after the collision, and FIG. 6C illustrates a state in a third stage after the collision. The machining head 101 operates in the order of the first stage to the third stage. In the second stage immediately after the collision, the first coupling surface 3a and the second coupling surface 3b are separated about the coupling surface fulcrum 3e. In the third stage after the collision, the separator 6a is completely separated from the stationary body as the operation of the machining head 101 is stopped. Areas enclosed in broken lines in FIGS. 6B and 6C each indicate a state of the coupling surface fulcrum 3e. In FIGS. 4A, 4B, 4C, FIGS. 5A, 5B, 5C, and FIGS. 6A, 6B, 6C, the tip 11a of the machining head 101 is retreated from the collision by the separation of the two coupling surfaces 3. This is an operation example where the retreat distance L2 of the tip 11a is larger than the separation distance L1 of the two coupling surfaces 3, and is larger than the distance of travel L of the machining head 101 until the operation is stopped by the stop command of the controller. Note that even when the separation distance L1 in the perpendicular direction of the second coupling surface 3b is small due to the direction in which the tip 11a collides, the separator 6a is separated from the stationary body 6b by the separation of the two coupling surfaces 3 of the buffer 2, so that it is possible to prevent a collision while the machining head keeps operating at a high speed and reduce damage to the machining head.

Figures 7A, 7B:
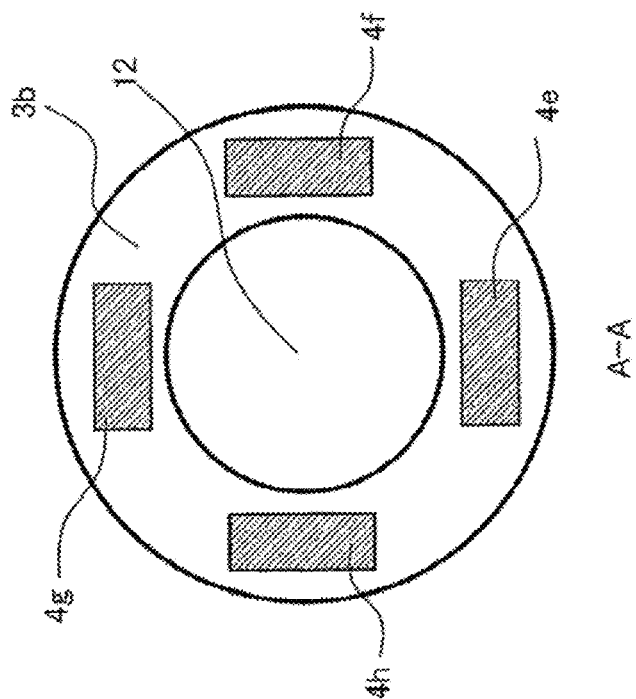
FIGS. 7A and 7B are explanatory diagrams illustrating an example of a configuration of the buffer using permanent magnets that is installed in the arm of the one-point oriented machining head of the three-dimensional laser processing machine according to the first embodiment.

Next, a description will be made of a configuration of the buffer 2 installed in the machining head 101 of the one-point oriented type of the three-dimensional laser processing machine according to the first embodiment. FIGS. 7A and 7B illustrates an explanatory diagram of an example of a configuration in which permanent magnets are used for the coupling member 4 of the buffer 2 installed in the first arm 120 of the arm 10 in the machining head 101 of the one-point oriented type of the three-dimensional laser processing machine according to the first embodiment. FIG. 7A explanatory diagram illustrating a structure of the buffer 2. FIG. 7B is a diagram illustrating a cross section taken along line A-A illustrated in FIG. 7A.

As illustrated in FIGS. 7A and 7B, each of the first coupling surface 3a and the second coupling surface 3b is formed in a ring shape surrounding the second optical axis 12. Permanent magnets are used for the coupling member 4. Specifically, permanent magnets 4a, 4b, 4c (not illustrated), and 4d for coupling are provided in the first coupler 31 including the first coupling surface 3a, and corresponding permanent magnets 4e, 4f, 4g, and 4h for coupling are provided in the second coupler 32 including the second coupling surface 3b. Note that instead of the permanent magnets, magnetic bodies 4e, 4f, 4g, and 4h may be used. The two coupling surfaces 3 are coupled by the coupling force f1 that is a magnetic force acting from the permanent magnets. The first coupling surface 3a and the second coupling surface 3b operate in a state of being coupled by the coupling force f1 that is the magnetic force acting from the permanent magnets 4a, 4b, 4c, and 4d for coupling and the corresponding permanent magnets 4e, 4f, 4g, and 4h (or the magnetic bodies 4e, 4f, 4g, and 4h) during normal operation. The two coupling surfaces 3 are separated when the collision force F acts on the tip 11a of the machining head 101. Here, the component force f2 of the collision force F acting in the perpendicular direction 3c of the second coupling surface 3b is smaller than the coupling force f1.

Note that although the plurality of permanent magnets as the coupling member 4 illustrated in is FIGS. 7A and 7B are installed along a circumferential direction of the two coupling surfaces 3, the shape and number of the permanent magnets are not limited thereto, and, for example, permanent magnets having a ring shape along the two coupling surfaces 3 may be used. The coupling member 4 may be a combination of the permanent magnets and the permanent magnets, or a combination of the permanent magnets and the magnetic bodies. Here, when a combination of the permanent magnets and the magnetic bodies is used, the magnetic bodies can be installed in any one of the first coupler 31 and the second coupler 32. The machining head according to the first embodiment and the three-dimensional laser processing machine using the machining head can separate a part of the machining head including the tip by the simple configuration of the buffer when the machining head collides with a workpiece or the like, and can cope with impacts from different directions. Furthermore, since the buffer is installed in the arm of the one-point oriented machining head, the buffer operation is activated even with a smaller impact by a moment of force, so that it is possible to retreat the tip nozzle and reduce damage to the machining head.

Second Embodiment

Figure 8:
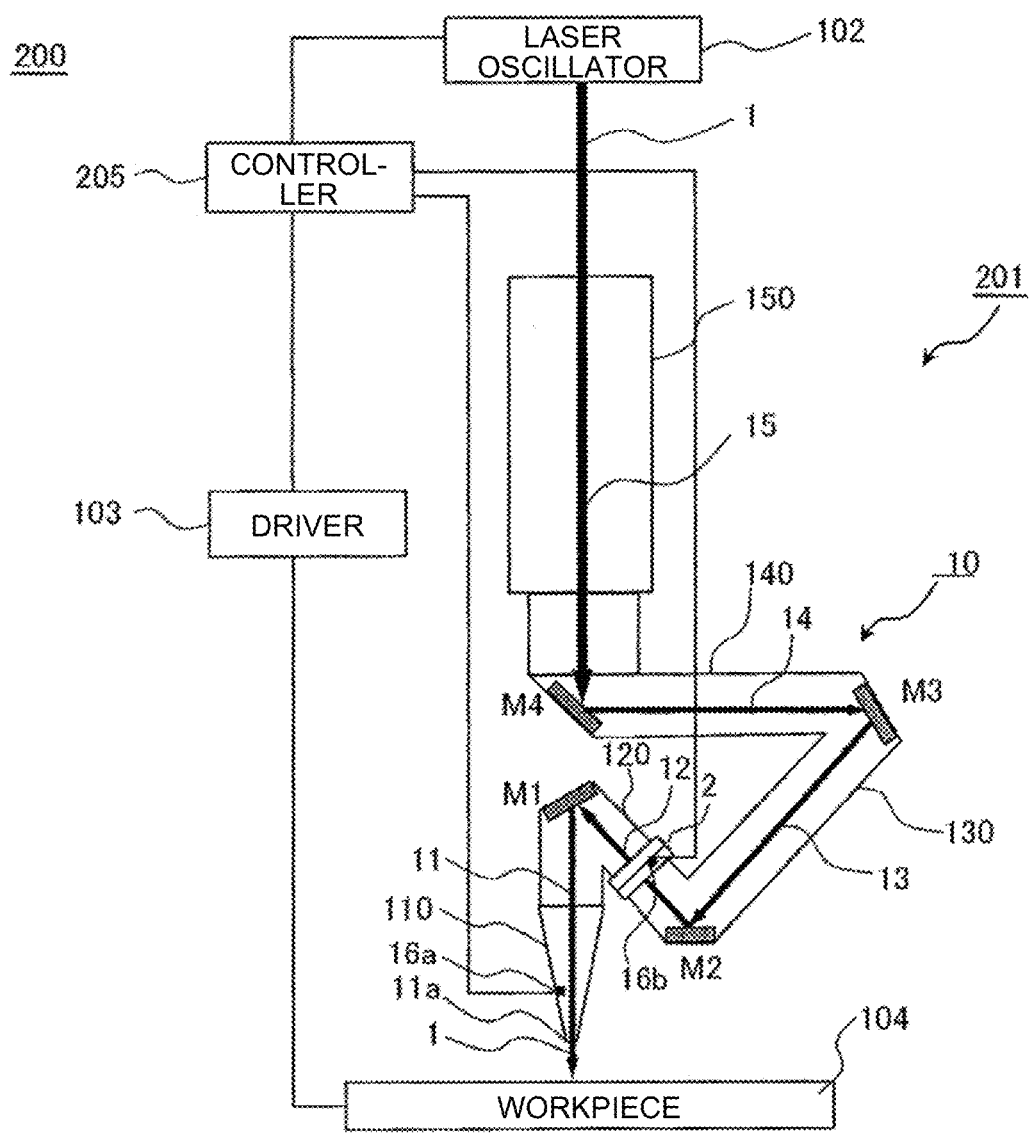
FIG. 8 is a block diagram illustrating a configuration of a three-dimensional laser processing machine according to a second embodiment.

FIG. 8 is a block diagram illustrating an example of a configuration of a three-dimensional laser processing machine 200 according to a second embodiment. In the second embodiment, parts that are different from those in the first embodiment of the present disclosure will be described, and description of parts identical or corresponding to those of the first embodiment will be omitted. In a machining head 201 of the three-dimensional laser processing machine 200 according to the second embodiment, a collision detection sensor 16a is provided in the tip nozzle 110, and a collision detection sensor 16b is provided in the buffer 2. In FIG. 8, the collision detection sensors 16a and 16b make a notification to a controller 205 upon detecting an anomaly, so that the controller 205 performs control to stop the operation of the machining head 201, block the laser beam 1, and stop the laser irradiation until the buffer 2 is restored. Note that although both of the collision detection sensors 16a and 16b are illustrated in FIG. 8, only one of them may be installed. For example, only the collision detection sensor 16b may be installed in the buffer 2.

Figure 10B:
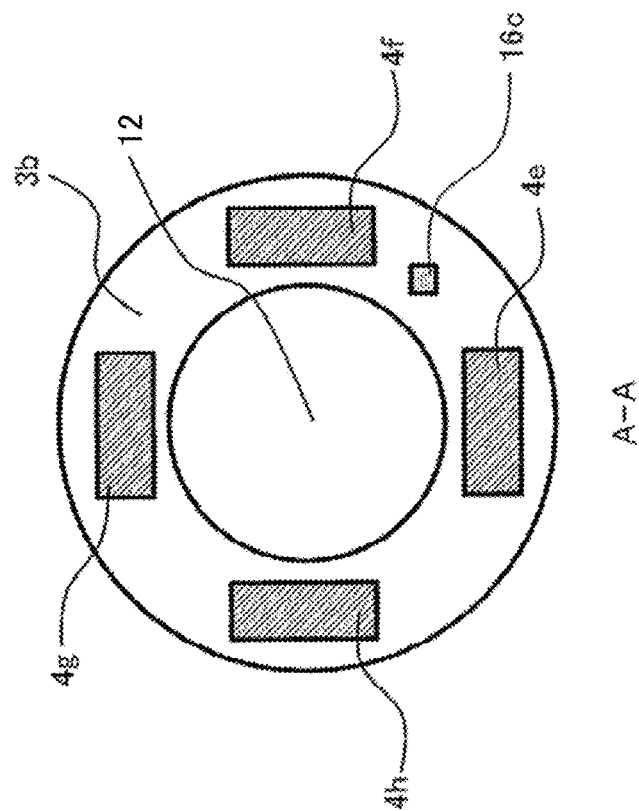
FIGS. 10A and 10B are explanatory diagrams illustrating an example of a configuration of the buffer and a separation detection sensor, the buffer being installed in the arm of the one-point oriented machining head of the three-dimensional laser processing machine according to the second embodiment.
Figure 10A:
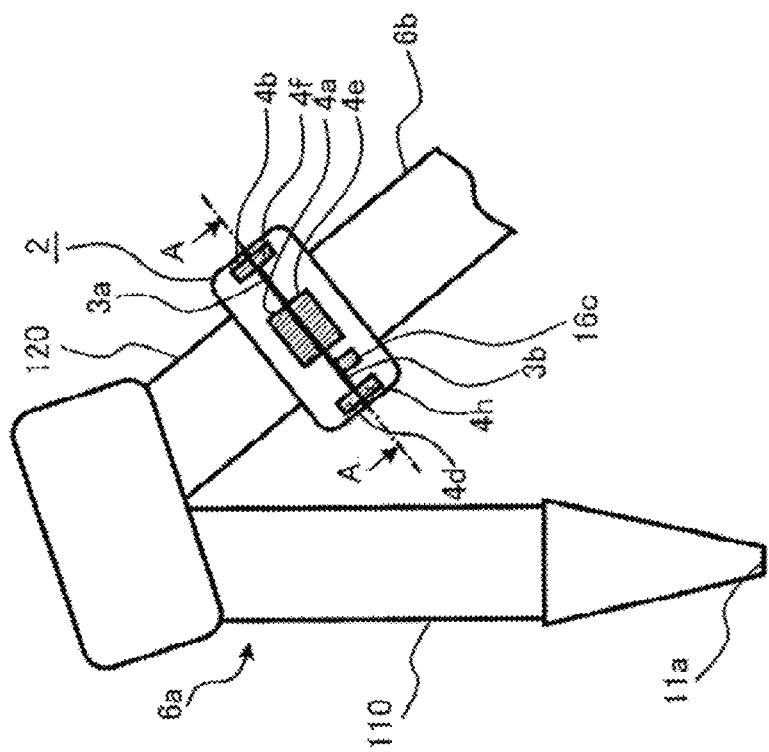

FIG. 9A explanatory diagram illustrating a configuration of the tip nozzle 110 in which the collision detection sensor 16a is installed and the buffer 2 in which the collision detection sensor 16b is installed in the machining head 201 of the one-point oriented type in the three-dimensional laser processing machine according to the second embodiment. FIG. 9B is a diagram illustrating a cross section taken along line A-A illustrated in FIG. 9A. Moreover, FIGS. 10A and 10B are explanatory diagrams illustrating a configuration of the buffer 2 and a separation detection sensor 16c, the buffer being installed in the arm 10 of the one-point oriented machining head 201 of the three-dimensional laser processing machine according to the second embodiment. FIG. 10A explanatory diagram illustrating a structure of the buffer 2 installed in the arm 10 and the separation detection sensor 16c. FIG. 10B is a diagram illustrating a cross section taken along line A-A illustrated in FIG. 10A. In FIGS. 9A, 9B, 10A, and 10B, the buffer 2 of the machining head 201 according to the second embodiment uses permanent magnets for the coupling member 4 as in the first embodiment, and operates in a state where the two coupling surfaces 3 are coupled by the coupling force f1 that is a magnetic force during normal operation. The two coupling surfaces 3 are separated when the collision force F acts on the tip 11a of the machining head. As with the first embodiment, the component force f2 of the collision force acting in the perpendicular direction 3c of the second coupling surface 3b is smaller than the coupling force f1.

First, the collision detection sensor 16a and the collision detection sensor 16b will be described. As illustrated in FIGS. 9A and 9B, the collision detection sensor 16a is installed in the tip 11a. When the tip 11a collides, the collision detection sensor 16a notifies the controller 205 of the laser processing machine of the collision in order to prevent further damage, thereby causing the operation of the machining head 201 to be stopped and the laser irradiation to be stopped. A time lag always occurs before the operation of the machining head 201 is completely stopped after the collision detection sensor 16a detects the collision, so that the machining head 201 operates during this period of time lag. Since the machining head 201 operates at a high speed, it is desirable that the tip 11a of the machining head 201 be able to be retreated immediately, and that the retreat distance L2 by which the tip 11a can be retreated as illustrated in FIGS. 4B and 5B be as long as possible. Therefore, the separator 6a including the tip 11a is separated from the stationary body 6b by the separation of the two coupling surfaces 3 using the buffer 2 in addition to the collision detection sensor 16a, and damage can be reduced. Note that many components such as a lens and a gas injection portion are installed in the tip nozzle 110 so that, in order to further reduce the size and weight of the separator 6a in the high speed operation of the machining head 201, the collision detection sensor 16b may be installed in the buffer 2. The collision detection sensor 16b installed on the side of the stationary body 6b in the buffer 2 illustrated in FIGS. 9A and 9B can similarly detect the collision of the tip 11a, and can obtain an effect similar to that of the collision detection sensor 16a.

Next, the separation detection sensor 16c will be described. As illustrated in FIGS. 10A and 10B, the separation detection sensor 16c is installed on the side of the stationary body 6b in the buffer 2. The separation detection sensor 16c detects the separation of the two coupling surfaces 3 of the buffer 2 and detects that the two coupling surfaces 3 are coupled again after the separation operation so that the separator 6a is restored to the original position, thereby making a notification to the controller 205. The controller 205 performs control to stop the operation of the machining head 201 and stop the laser irradiation before the buffer 2 is restored. Note that the separation detection sensor 16c may be common to the collision detection sensor 16b and may use the same sensor as the collision detection sensor 16b. In this case, the separation detection sensor 16c detects the collision of the tip 11a and the separation of the two coupling surfaces 3 and makes a notification to the controller 205, and the controller 205 performs control to stop the operation of the machining head 201, block the laser beam 1, and stop the laser irradiation until the buffer 2 is restored.

The machining head according to the second embodiment and the three-dimensional laser processing machine using the machining head can reduce damage to the machining head at the time of a collision by the simple configuration of the buffer as in the first embodiment. Furthermore, the operation of the machining head and the laser irradiation are stopped by detecting the collision and the separation of the buffer using the collision detection sensor or the separation detection sensor in combination, so that the risk of damage to the three-dimensional laser processing machine can be further reduced.

Third Embodiment

FIGS. 11A and 11B illustrates an explanatory diagram of an example of a configuration in which electromagnets are used for the coupling member 4 of the buffer 2 installed in the first arm 120 of the arm in the one-point oriented machining head of the three-dimensional laser processing machine according to a third embodiment. FIG. 11A explanatory diagram illustrating a structure of the buffer 2. FIG. 11B is a diagram illustrating a cross section taken along line A-A illustrated in FIG. 11A. In the third embodiment, parts that are different from those in the first embodiment of the present disclosure will be described, and description of parts identical or corresponding to those of the first embodiment will be omitted.

As with the configuration of the first embodiment illustrated in FIGS. 7A and 7B, in the third embodiment illustrated in FIGS. 11A and 11B, the buffer 2 is installed in the first arm 120 of the arm in the machining head of the one-point oriented type. While the permanent magnets are used for the coupling member 4 in the first embodiment, the electromagnets are used for the coupling member 4 to obtain the coupling force f1 in the third embodiment. The two coupling surfaces 3 are coupled by the coupling force f1 that is the electromagnetic force acting from the electromagnets. Each of the first coupling surface 3a and the second coupling surface 3b is formed in a ring shape surrounding the second optical axis 12. Specifically, the electromagnets used for the coupling member 4 include electromagnets 5a, 5b, 5c (not illustrated), and 5d for coupling that are provided in the first coupler 31 including the first coupling surface 3a, and corresponding electromagnets 5e, 5f, 5g, and 5h for coupling that are provided in the second coupler 32 including the second coupling surface 3b. Note that instead of the electromagnets, magnetic bodies 5a, 5b, 5c, and 5d may be used. The first coupling surface 3a and the second coupling surface 3b operate in a state of being coupled by the coupling force f1 that is the electromagnetic force acting from the electromagnets 5a, 5b, 5c, and 5d (or the magnetic bodies 5a, 5b, 5c, and 5d) for coupling and the corresponding electromagnets 5e, 5f, 5g, and 5h for coupling during normal operation. The two coupling surfaces 3 are separated when the collision force F acts on the tip 11a of the machining head. Here, the component force f2 of the collision force acting in the perpendicular direction 3c of the second coupling surface 3b is smaller than the coupling force f1.

Note that although the plurality of electromagnets as the coupling member 4 illustrated in FIGS. 11A and 11B are installed along the circumferential direction of the two coupling surfaces 3, the shape and number of the electromagnets are not limited thereto, and, for example, electromagnets having a ring shape along the second coupling surface 3b may be used. The coupling member 4 may be a combination of the electromagnets and the electromagnets, or a combination of the electromagnets and the magnetic bodies. Here, when the combination of the electromagnets and the magnetic bodies is used, it is desired that the electromagnets be installed on the side of the stationary body 6b, and the magnetic bodies be installed on the side of the separator 6a. Moreover, when the buffer 2 of the third embodiment is used, the first embodiment may be used in combination in order for the two coupling surfaces 3 to not be separated when the power supply of the device is stopped or during a power failure. In this case, the coupling member 4 includes the permanent magnet and the electromagnet, and the two coupling surfaces 3 are coupled by the coupling force f1 that is a total force of the magnetic force acting from the permanent magnet and the electrode force acting from the electromagnet. The permanent magnet has the magnetic force that is the minimum coupling force by which the coupling between the two coupling surfaces 3 is maintained even during a power failure.

Moreover, a similar effect can be obtained by a configuration in which a collision detection sensor 16d for detecting a collision force is installed in the tip 11a, a notification is made to the controller of the laser processing machine when a collision of the tip 11a is detected, and the controller performs control to stop the current supplied to the electromagnets to cause the two coupling surfaces 3 to be separated. The collision detection sensor 16d can also have the function of notifying the controller of the laser processing machine of the collision. The collision detection sensor 16d provides the notification to the controller upon detecting the collision of the tip 11a, so that the controller can perform control to stop the current supplied to the electromagnets to cause the two coupling surfaces 3 to be separated, and also stop the operation of the machining head and the laser irradiation.

The machining head according to the third embodiment and the three-dimensional laser processing machine using the machining head can reduce damage to the machining head at the time of a collision by the simple configuration of the buffer as in the first embodiment. Furthermore, by using the collision detection sensor in combination and detecting the collision, the operation of the machining head and the laser irradiation are stopped so that the risk of damage to the three-dimensional laser processing machine can be further reduced.

Fourth Embodiment

FIGS. 12A and 12B are explanatory diagrams of an example of a configuration in which vacuum suckers are used for the coupling member 4 of the buffer 2 installed in the first arm 120 of the arm in the one-point oriented machining head of the three-dimensional laser processing machine according to a fourth embodiment. FIG. 12A explanatory diagram illustrating a structure of the buffer 2. FIG. 12B is a diagram illustrating a cross section taken along line A-A illustrated in FIG. 12A. In the fourth embodiment, parts that are different from those in the first embodiment of the present disclosure will be described, and description of parts identical or corresponding to those of the first embodiment will be omitted.

As with the configuration of the first embodiment illustrated in FIGS. 7A and 7B, in the fourth embodiment illustrated in FIGS. 12A and 12B, the buffer 2 is installed in the first arm 120 of the arm in the machining head of the one-point oriented type. While the permanent magnets are used for the coupling member 4 in the first embodiment, the vacuum suckers are used for the coupling member 4 to obtain the coupling force f1 in the fourth embodiment. The two coupling surfaces 3 are coupled by the coupling force f1 that is the vacuum suction force acting from the vacuum suckers. The first coupling surface 3a and the second coupling surface 3b facing the first coupling surface 3a is each formed in a ring shape surrounding the second optical axis 12. The coupling member 4 includes the vacuum suckers. Specifically, vacuum suckers 7a, 7b, 7c, and 7d are provided in the second coupler 32 including the second coupling surface 3b. The vacuum suckers 7a, 7b, 7c, and 7d achieve a depressurized state by means (not illustrated) such as a vacuum pump to suction and couple the two coupling surfaces 3. The first coupling surface 3a and the second coupling surface 3b operate in a state of being suctioned by the vacuum suckers 7a, 7b, 7c, and 7d with the coupling force f1 during normal operation. The two coupling surfaces 3 are separated when the collision force F acts on the tip 11a of the machining head. Here, the component force f2 of the collision force acting in the perpendicular direction 3c of the second coupling surface 3b is smaller than the coupling force f1.

Note that although four of the vacuum suckers used for the coupling member 4 illustrated in FIGS. 12A and 12B are installed along the circumferential direction of the second coupling surface 3b, the shape and number of the vacuum suckers are not limited thereto, and, for example, vacuum suckers having a ring shape along the second coupling surface 3b may be used. Moreover, when the buffer 2 of the fourth embodiment is used, the first embodiment may be used in combination in order for the two coupling surfaces 3 to not be separated when the power supply of the device is stopped or during a power failure. In this case, the coupling member 4 includes the permanent magnet and the vacuum sucker, and the two coupling surfaces 3 are coupled by the coupling force f1 that is a total force of the magnetic force acting from the permanent magnet and the vacuum suction force acting from the vacuum sucker. The permanent magnet has the magnetic force that is the minimum coupling force by which the coupling between the two coupling surfaces 3 is maintained even during a power failure.

Moreover, a similar effect can be obtained by a configuration in which a collision detection sensor 16e for detecting a collision force is installed in the tip 11a, a notification is made to the controller 105 of the laser processing machine when a collision of the tip 11a is detected, and the controller 105 performs control to stop the current supplied to the vacuum suckers to cause the two coupling surfaces 3 to be separated. The collision detection sensor 16e can also have the function of notifying the controller of the laser processing machine of the collision. The collision detection sensor 16e provides the notification to the controller upon detecting the collision of the tip 11a, so that the controller can perform control to stop the current supplied to the vacuum suckers to cause the two coupling surfaces 3 to be separated, and also stop the operation of the machining head and the laser irradiation.

The machining head according to the fourth embodiment and the three-dimensional laser processing machine using the machining head can reduce damage to the machining head at the time of a collision by the simple configuration of the buffer as in the first embodiment. Furthermore, by using the collision detection sensor in combination and detecting the collision, the operation of the machining head and the laser irradiation are stopped so that the risk of damage to the three-dimensional laser processing machine can be further reduced.

Fifth Embodiment

FIGS. 13A and 13B are explanatory diagrams illustrating the buffer 2 using plastically deformable members and an operation of the buffer 2, the buffer 2 being installed in the arm 10 of the machining head 101 of the one-point oriented type in the three-dimensional laser processing machine according to a fifth embodiment. FIG. 13A illustrates the buffer 2 during normal operation. FIG. 13B is a diagram illustrating a separated state of the buffer 2 immediately after a collision. In the fifth embodiment, parts that are different from those in the first embodiment of the present disclosure will be described, and description of parts identical or corresponding to those of the first embodiment will be omitted.

As with the configuration of the first embodiment illustrated in FIGS. 7A and 7B, in the fifth embodiment illustrated in FIGS. 13A and 13B, the buffer 2 is installed in the arm 10 in the machining head of the one-point oriented type. While the permanent magnets are used for the coupling member 4 in the first embodiment, the plastically deformable members are used for the coupling member 4 to obtain the coupling force f1 in the fifth embodiment. The two coupling surfaces 3 are coupled by the coupling force f1 that is a yield stress acting from the plastically deformable members. The coupling member 4 is a plastically deformable member with both ends fixed to corresponding ones of the first coupler 31 and the second coupler 32, and is made of a bent wire material such as a light alloy having a low yield point. As illustrated in FIGS. 13A and 13B, plastically deformable members 8a, 8b, 8c, and 8d are disposed on outer peripheries of the first coupler 31 and the second coupler 32. The first coupling surface 3a and the second coupling surface 3b operate in a state of being coupled by the coupling force f1 that is the yield stress by the plastically deformable members 8a, 8b, 8c, and 8d during normal operation. The two coupling surfaces 3 are separated when the collision force F acts on the tip 11a of the machining head. Here, the component force f2 of the collision force acting in the perpendicular direction 3c of the second coupling surface 3b is smaller than the coupling force f1.

Note that although the plurality of plastically deformable members used for the coupling member 4 illustrated in FIGS. 13A and 13B are evenly arranged along the outer peripheries of the first coupler 31 and the second coupler 32, the shape, number, and position of arrangement of the plastically deformable members are not limited thereto. Also, as illustrated in FIGS. 13A and 13B, the collision detection sensor 16b is installed in the buffer 2. In the fifth embodiment, the collision detection sensor 16a and the separation detection sensor 16c as in the second embodiment may be installed in the machining head. The machining head according to the fifth embodiment and the three-dimensional laser processing machine using the machining head can reduce damage to the machining head at the time of a collision by the simple configuration of the buffer as in the first embodiment. Furthermore, by using the collision detection sensor in combination and detecting the collision, the operation of the machining head and the laser irradiation are stopped so that the risk of damage to the three-dimensional laser processing machine can be further reduced.

Sixth Embodiment

FIGS. 14A and 14B are explanatory diagrams illustrating the buffer 2 using an elastically deformable member that is a coil spring and an operation of the buffer 2, the buffer 2 being installed in the arm 10 of the machining head of the one-point oriented type in the three-dimensional laser processing machine according to a sixth embodiment. FIG. 14A illustrates the buffer 2 during normal operation. FIG. 14B is a diagram illustrating a separated state of the buffer 2 immediately after a collision. In the sixth embodiment, parts that are different from those in the first embodiment of the present disclosure will be described, and description of parts identical or corresponding to those of the first embodiment will be omitted.

As with the configuration of the first embodiment illustrated in FIGS. 7A and 7B, in the sixth embodiment illustrated in FIGS. 14A and 14B, the buffer 2 is installed in the first arm 120 of the arm 10 in the machining head of the one-point oriented type. While the permanent magnets are used for the coupling member 4 in the first embodiment, the elastically deformable member that is a coil spring 9 is used for the coupling member 4 to obtain the coupling force f1 in the sixth embodiment. The two coupling surfaces 3 are coupled by the coupling force f1 that is an elastic force acting from the coil spring 9. The coil spring 9 used for the coupling member 4 has both ends fixed to corresponding outer peripheries of the first coupler 31 and the second coupler 32, and has the elastic force that presses the first coupler 31 and the second coupler 32. The first coupling surface 3a and the second coupling surface 3b operate in a state of being coupled by the coupling force f1 that is the elastic force by the coil spring 9 during normal operation. When the collision force F acts on the tip 11a of the machining head, the coil spring 9 extends and opens so that the two coupling surfaces 3 are separated. Here, the component force f2 of the collision force acting in the perpendicular direction 3c of the second coupling surface 3b is smaller than the coupling force f1.

Figure 15A:
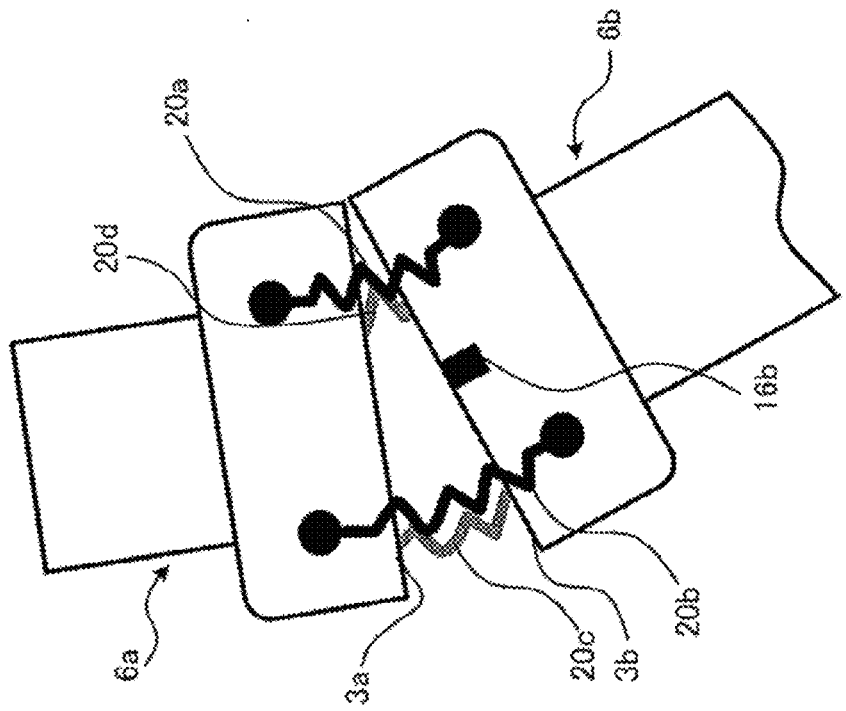
FIGS. 15A and 15B are explanatory diagrams illustrating the buffer using elastically deformable members and an operation of the buffer, the buffer being installed in the arm of the one-point oriented machining head of the three-dimensional laser processing machine according to the sixth embodiment.
Figure 15B:
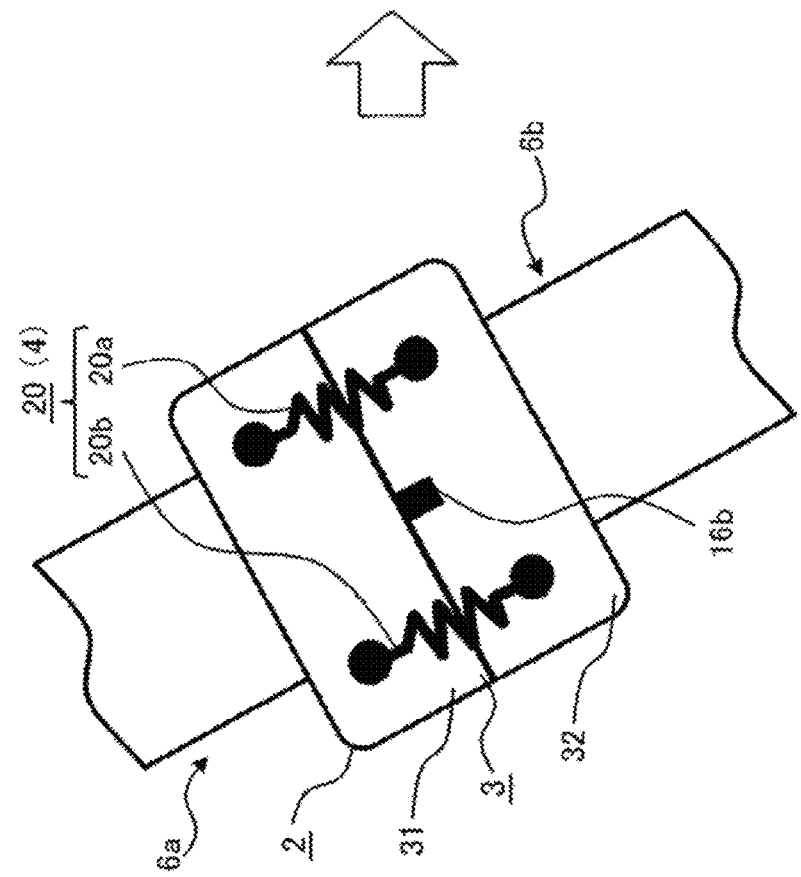

Note that although the coil spring 9 used for the coupling member 4 illustrated in FIGS. 14A and 14B is disposed so as to be wound around the outer peripheries of the first coupler 31 and the second coupler 32, the shape and number of the coil springs 9 are not limited thereto as long as the two coupling surfaces 3 can be coupled by the coupling force f1 that is the elastic force. FIGS. 15A and 15B are explanatory diagrams illustrating the buffer 2 using an elastically deformable member 20 and an operation of the buffer 2 as a variation of the sixth embodiment. FIG. 15A illustrates the buffer 2 during normal operation. FIG. 15B is a diagram illustrating a separated state of the buffer 2 immediately after a collision.

As illustrated in FIGS. 15A and 15B, the two coupling surfaces 3 are coupled by the coupling force f1 that is an elastic force acting from the elastically deformable member 20. The elastically deformable member 20 having both ends fixed to corresponding ones of the first coupler 31 and the second coupler 32 and having the elastic force is used as the coupling member 4. Specifically, elastically deformable members 20a, 20b, 20c, and 20d are evenly disposed along the outer peripheries of the first coupler 31 and the second coupler 32. The first coupling surface 3a and the second coupling surface 3b operate in a state of being coupled by the coupling force f1 that is an elastic force by the elastically deformable members 20a, 20b, 20c, and 20d during normal operation. The two coupling surfaces 3 are separated when the collision force F acts on the tip 11a of the machining head. Here, the component force f2 of the collision force acting in the perpendicular direction 3c of the second coupling surface 3b is smaller than the coupling force f1. Also, as illustrated in FIGS. 14A, 14B, and FIGS. 15A, 15B the collision detection sensor 16b is installed in the buffer 2.

In the sixth embodiment, the collision detection sensor 16a and the separation detection sensor 16c as in the second embodiment may be installed in the machining head.

The machining head according to the sixth embodiment and the three-dimensional laser processing machine using the machining head can reduce damage to the machining head at the time of a collision by the simple configuration of the buffer as in the first embodiment. Furthermore, by using the collision detection sensor in combination and detecting the collision, the operation of the machining head and the laser irradiation are stopped so that the risk of damage to the three-dimensional laser processing machine can be further reduced.

Seventh Embodiment

Figure 16:
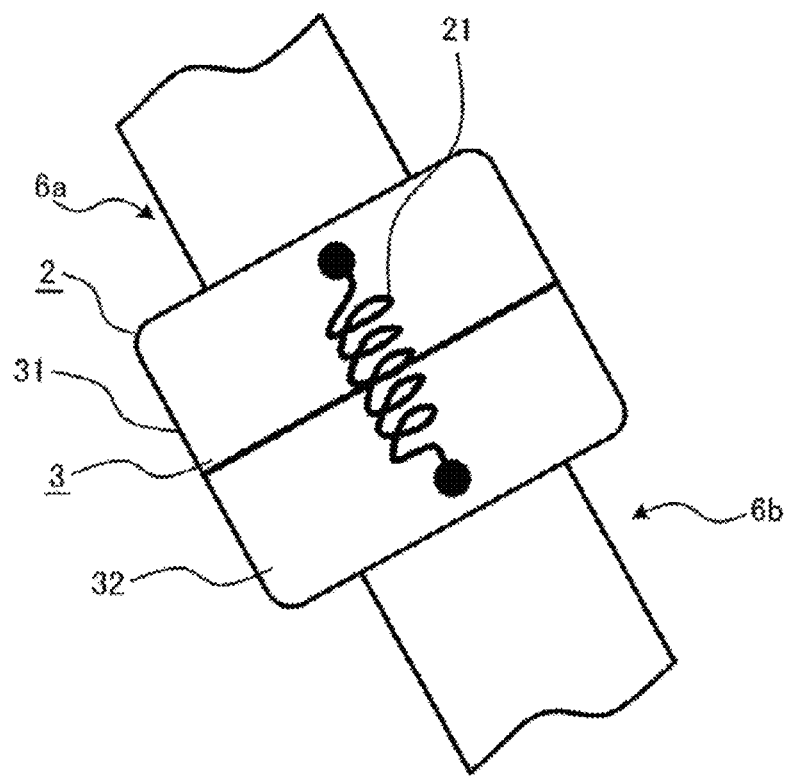
FIG. 16 explanatory diagram illustrating the buffer including a wire stopper installed in the arm of the one-point oriented machining head of the three-dimensional laser processing machine according to a seventh embodiment.

FIG. 16 is a diagram illustrating the buffer 2 including a wire stopper 21 installed in the arm 10 of the one-point oriented machining head of the three-dimensional laser processing machine according to a seventh embodiment. The seventh embodiment is configured such that the machining head of the three-dimensional laser processing machine according to the first to sixth embodiments is further provided with the wire stopper 21 for reducing the risk of the separator 6a falling down and colliding again with the workpiece or the like when the separator 6a is separated.

As illustrated in FIG. 16, both ends of the wire stopper 21 having stretchability are fixed to corresponding ones of the first coupler 31 and the second coupler 32. Note that the wire stopper 21 needs only be installed to connect the stationary body 6b and the separator 6a with the both ends fixed to corresponding ones of the stationary body 6b and the separator 6a. The wire stopper 21 is flexed in a state where the two coupling surfaces 3 are coupled with the flection being pulled, whereas when the two coupling surfaces 3 are separated, the wire stopper extends to connect the stationary body 6b and the separator 6a, and prevents the separator 6a from falling completely. Note that although FIG. 16 illustrates one wire stopper 21 installed in the buffer 2, the number and shape of the wire stoppers 21 are not limited thereto.

The machining head according to the seventh embodiment and the three-dimensional laser processing machine using the machining head have an effect similar to that of the first to sixth embodiments. Furthermore, since the wire stopper is provided in the buffer, the separator does not fall completely when separated by a collision, so that the risk of damage to the machining head and the workpiece can be reduced. In addition, when laser processing is performed again, the recovery work for coupling the two coupling surfaces can be easily performed.

Eighth Embodiment

Figure 17:
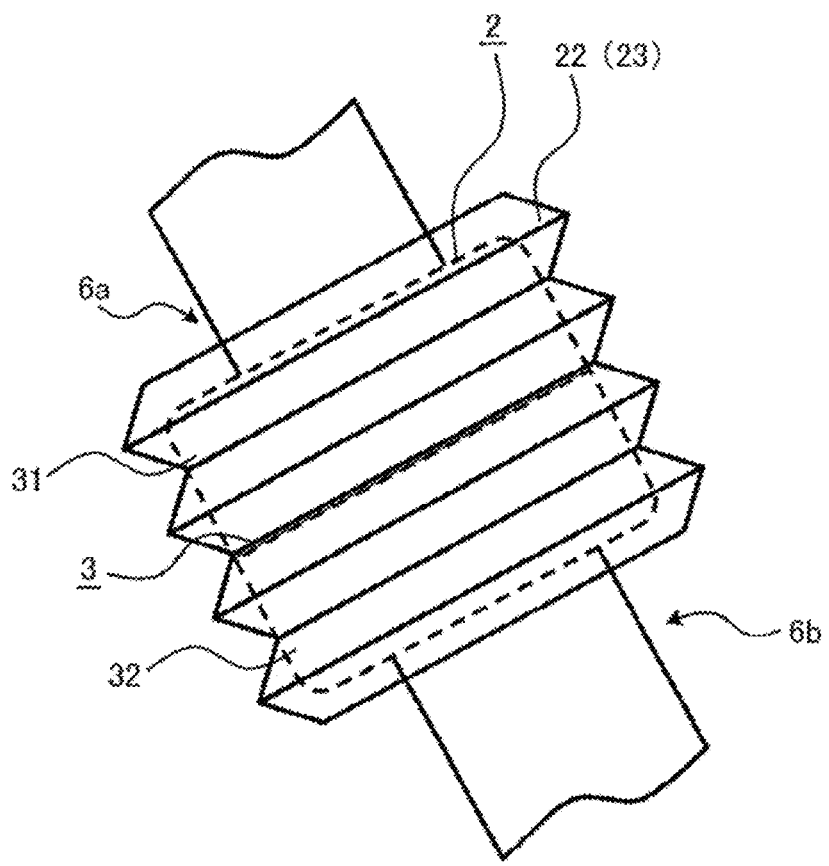
FIG. 17 explanatory diagram illustrating the buffer including a protective cover installed in the arm of the one-point oriented machining head of the three-dimensional laser processing machine according to eighth and ninth embodiments.

FIG. 17 is a diagram illustrating the buffer 2 including a protective cover 22 installed in the arm of the one-point oriented machining head of the three-dimensional laser processing machine according to an eighth embodiment. The eighth embodiment has a configuration in which the buffer 2 is further provided with the protective cover 22 in the machining head of the three-dimensional laser processing machine according to the first to sixth embodiments. As illustrated in FIG. 17, the protective cover 22 is made of a cylindrical stretchable material and is, for example, a cover having a bellows structure. The protective cover 22 is installed to cover the two coupling surfaces 3 from the outer periphery of the buffer 2 so as not to expose the two coupling surfaces 3, and can prevent foreign matter such as machining waste and dust from entering the optical path of the machining head when the two coupling surfaces 3 are separated. The protective cover 22 may also incorporate the function of the wire stopper 21 provided in the machining head according to the seventh embodiment. In this case, the protective cover 22 is installed with both ends fixed to corresponding ones of the stationary body 6b and the separator 6a, and extends to cover the two coupling surfaces 3 when the two coupling surfaces 3 are separated, thereby also being able to prevent the separator 6a from falling completely.

The machining head according to the eighth embodiment and the three-dimensional laser processing machine using the machining head have an effect similar to that of the first to sixth embodiments. Furthermore, the buffer is provided with the protective cover so that even when the two coupling surfaces 3 are separated, the entry of foreign matter into the optical path of the machining head can be prevented, and a function of preventing the separator from falling can also be added to the protective cover.

Ninth Embodiment

In a ninth embodiment, a cylindrical stretchable coupling cover 23 similar to the protective cover as illustrated in FIG. 17 is used for the coupling member 4 of the buffer 2. As with the first to sixth embodiments, during normal operation, the two coupling surfaces 3 operate in a state of being coupled by the coupling force f1 that is a stretching stress by the coupling member 4 using the coupling cover 23. When the collision force F acts on the tip 11a of the machining head, the two coupling surfaces 3 are separated so that the separator 6a separates from the stationary body 6b and retreats from an object with which the tip has collided. Here, the component force f2 of the collision force acting in the perpendicular direction 3c of the second coupling surface 3b is smaller than the coupling force f1. In addition, the coupling cover 23 used for the coupling member 4 can be a protective cover having a structure that stretches in a state in which the first coupling surface 3a and the second coupling surface 3b are separated to cover the first coupling surface 3a and the second coupling surface 3b. In this case, the cover also has the function of preventing entry of foreign matter into the optical path and preventing falling of the separator. That is, the function of the coupling cover and the function of the protective cover can be implemented by a single cover.

The machining head according to the ninth embodiment and the three-dimensional laser processing machine using the machining head have an effect similar to that of the first to sixth embodiments. Furthermore, the coupling member using the coupling cover also has an effect of preventing entry of foreign matter into the optical path and preventing falling of the separator.

Tenth Embodiment

Figure 18A:
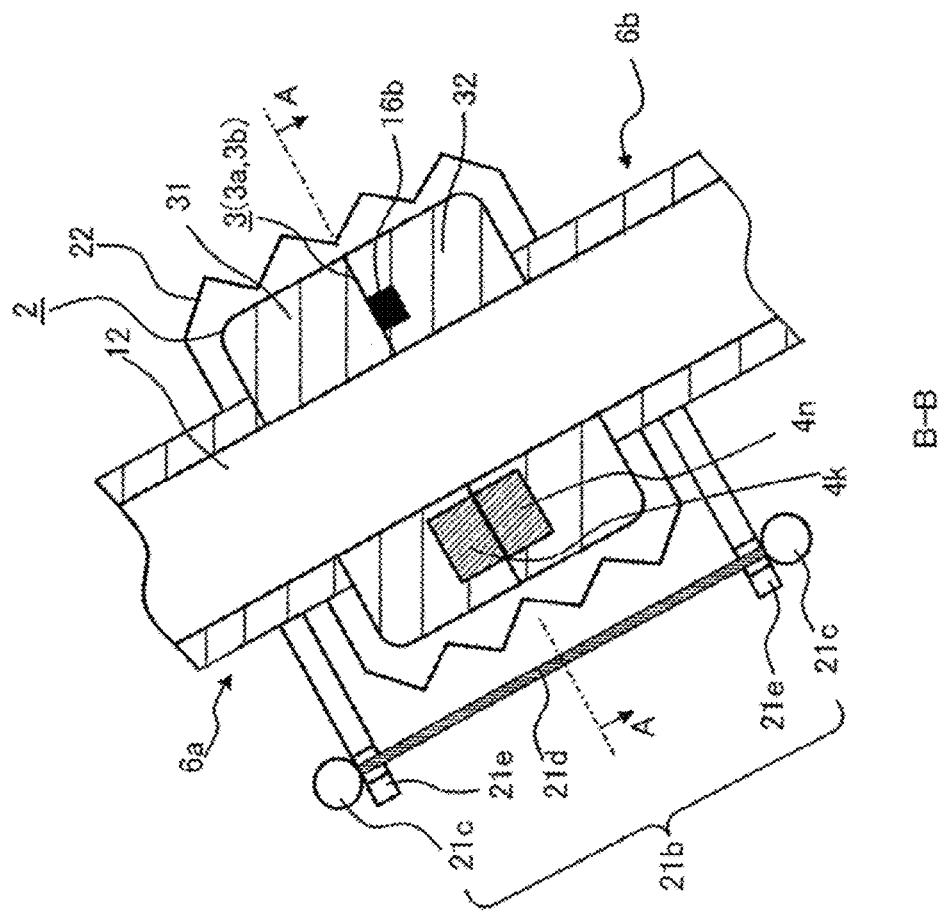
FIGS. 18A and 18B are explanatory diagrams illustrating the buffer including a wire stopper and the protective cover installed in the arm of the one-point oriented machining head of the three-dimensional laser processing machine according to a tenth embodiment.
Figure 18B:
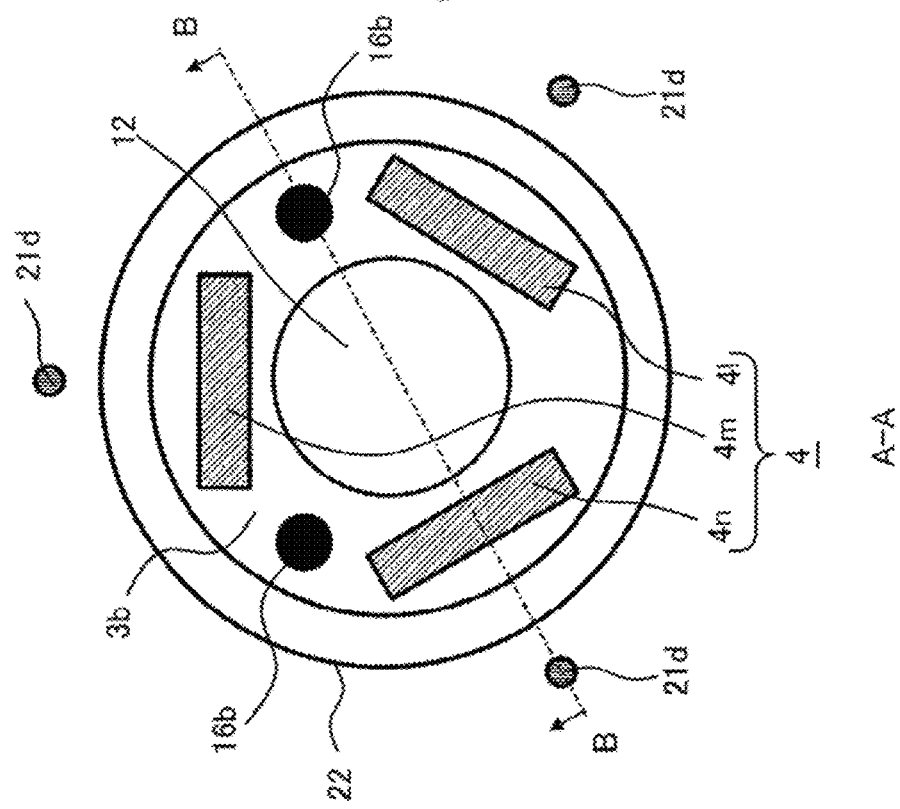

FIGS. 18A and 18B illustrates an explanatory diagram of the buffer 2 that is provided with a wire stopper 21b and the protective cover 22 and is installed in the arm of the one-point oriented machining head of the three-dimensional laser processing machine according to a tenth embodiment. FIG. 18A is a cross-sectional view along the second coupling surface 3b of the buffer 2, and is a diagram illustrating a cross section taken along line A-A illustrated in FIG. 18B. FIG. 18B is a diagram illustrating a cross section taken along line B-B illustrated in FIG. 18A. The tenth embodiment has a configuration in which the buffer 2 is further provided with the protective cover 22 and the wire stopper 21b in the machining head of the three-dimensional laser processing machine according to the first to sixth embodiments.

First, a description will be made of an example in which the permanent magnets described in the first embodiment are used for the coupling member 4 of the buffer 2 in the tenth embodiment. In the buffer 2 of the tenth embodiment, each of the first coupling surface 3a and the second coupling surface 3b is formed in a ring shape surrounding the second optical axis 12. Permanent magnets are used for the coupling member 4. Specifically, the first coupler 31 is provided with permanent magnets 4i (not illustrated), 4j (not illustrated), and 4k for coupling, and the second coupler 32 is provided with corresponding permanent magnets or magnetic bodies 4l, 4m, and 4n for coupling. The two coupling surfaces 3 are coupled by the coupling force f1 that is a magnetic force acting from the permanent magnets. The first coupling surface 3a and the second coupling surface 3b operate in a state of being coupled by the coupling force f1 that is the magnetic force acting from the permanent magnets 4i, 4j, and 4k for coupling and the corresponding permanent magnets or magnetic bodies 4l, 4m, and 4n during normal operation. The two coupling surfaces 3 are separated when the collision force F acts on the tip 11a of the machining head. Here, the component force f2 of the collision force acting in the perpendicular direction 3c of the second coupling surface 3b is smaller than the coupling force f1.

Next, the collision detection sensor 16b installed in the buffer 2 will be described. The collision detection sensor 16b is installed on the second coupling surface 3b of the buffer 2. A plurality of the collision detection sensors may be installed. The collision detection sensor 16b makes a notification to the controller 205 as illustrated in FIG. 8 upon detecting an anomaly, and the controller 205 performs control to stop the operation of the machining head 201 and block the laser beam 1. The collision detection sensor 16b can also have a function of a separation detection sensor. As a result, the collision detection sensor 16b detects a separated state of the two coupling surfaces 3 and makes a notification to the controller 205, and the controller 205 performs control to stop the laser irradiation until the buffer 2 is restored.

Next, the protective cover 22 and the wire stopper 21b installed in the buffer 2 will be described. As illustrated in FIGS. 18A and 18B, the protective cover 22 described in the eighth embodiment is provided outside the buffer 2. The protective cover 22 is made of a cylindrical stretchable material and is, for example, a cover having a bellows structure. The protective cover 22 is installed to cover the first coupling surface 3a and the second coupling surface 3b from the outer periphery of the buffer 2 so as not to expose the first coupling surface 3a and the second coupling surface 3b. The protective cover stretches to cover the buffer 2 in a state where the first coupling surface 3a and the second coupling surface 3b are separated, and prevents foreign matter such as machining waste and dust from entering the optical path of the machining head.

The wire stopper 21b made of metal is also installed outside the protective cover 22. The wire stopper 21b has the same function as the wire stopper 21 described in the seventh embodiment. The wire stopper 21b is installed to connect the stationary body 6b and the separator 6a with both ends fixed to corresponding ones of the stationary body 6b and the separator 6a.

As illustrated in FIG. 18B, the wire stopper 21b includes a wire 21d, wire catches 21c attached to both ends of the wire 21d, and a holder 21e with a hole larger than the wire diameter of the wire 21d and smaller than the outer diameter of the wire catch 21c. The holder 21e is fixed to each of the stationary body 6b and the separator 6a, and the wire 21d is held by the holder 21e. The wire catch 21c is, for example, a spherical member having a diameter larger than the hole diameter of the holder 21e. The wire 21d is loosened by a predetermined amount while the first coupling surface 3a and the second coupling surface 3b are coupled. The wire 21d of the wire stopper 21b extends when the separator 6a separates from the stationary body 6b, but the wire catch 21c is caught in the hole of the holder 21e to prevent the separator 6a from falling completely.

Here, the wire 21d is held by the holder 21e and thus does not affect the installation of the protective cover 22, so that the wire stopper 21b and the protective cover 22 can be used together. As illustrated in FIG. 18A, in the tenth embodiment, a plurality of the wire stoppers 21b is installed along the outer periphery of the buffer 2. It is thus possible to cope with collisions from different directions and to prevent the separator 6a from falling.

The machining head according to the tenth embodiment and the three-dimensional laser processing machine using the machining head have an effect similar to that of the first to sixth embodiments. Furthermore, the buffer is provided with the protective cover and the wire stoppers to be able to prevent foreign matter from entering the optical path of the machining head and prevent the separator from falling completely even when the two coupling surfaces 3 are separated. The risk of damage to the machining head and the workpiece can be further reduced.

Note that the embodiments can be combined, modified, and/or omitted as appropriate.

REFERENCE SIGNS LIST 1 laser beam; 2 buffer; 3 two coupling surfaces; 3a first coupling surface; 3b second coupling surface; 3c perpendicular direction of second coupling surface; 3d parallel direction of second coupling surface; 3e, 3f coupling surface fulcrum; 4 coupling member; 6a separator; 6b stationary body; 9 coil spring; 10 arm; first optical axis; 11a tip; 12 second optical axis; third optical axis; 14 fourth optical axis; 15 fifth optical axis; 16a, 16b, 16d, 16e collision detection sensor; 16c separation detection sensor; 21, 21b wire stopper; 22 protective cover; 23 coupling cover; 31 first coupler; 32 second coupler; 100 three-dimensional laser processing machine; 101 machining head; 102 laser oscillator; 103 driver; 104 workpiece; 105 controller; 110 tip nozzle; 120 first arm; 130 second arm; 140 third arm; 150 incident portion; 200 three-dimensional laser processing machine; 201 machining head; 205 controller.

The invention claimed is:

1. A machining head having a multi-axis structure that rotatably supports orientation of a tip that emits a laser beam, the machining head comprising:
a buffer installed in an arm that forms a predetermined angle with a direction in which the laser beam is emitted, wherein
the buffer includes:
a first coupler that includes a first coupling surface provided nearer to the tip than a second coupler;
the second coupler includes a second coupling surface facing the first coupling surface; and
a coupling member including permanent magnets provided on at least one of the first coupler and the second coupler to couple the first coupling surface and the second coupling surface, and
when a collision occurs at the tip, the first coupling surface and the second coupling surface are separated, and a separator ranging from the tip to the first coupling surface separates from a stationary body that is the arm on a side of the second coupling surface,
wherein the machining head is configured to cope with impacts from different directions with a configuration of one said buffer.

2. The machining head according to claim 1, wherein in the machining head,
the arm is connected to a tip nozzle including the tip and includes a first arm, a second arm, and a third arm each forming a predetermined angle with the direction in which the laser beam is emitted, and
the buffer is installed in the first arm closest to the tip nozzle in the arm.

3. The machining head according to claim 1, wherein in the machining head,
a first optical axis is included in a tip nozzle including the tip,
the arm is connected to the tip nozzle and includes a first arm, a second arm, and a third arm that include a second optical axis, a third optical axis, and a fourth optical axis, respectively, and
the buffer is installed in the first arm including the second optical axis that is an optical axis closest to the first optical axis in the arm.

4. The machining head according to claim 1, wherein the first coupling surface and the second coupling surface are coupled by a coupling force f1 acting from the coupling member, and
a component force f2 of a collision force of a collision acting in a perpendicular direction of the second coupling surface is smaller than the coupling force f1.

5. The machining head according to claim 4, wherein the coupling member couples the first coupling surface and the second coupling surface by the coupling force f1 that is a magnetic force acting from the permanent magnets.

6. The machining head according to claim 4, wherein the coupling member includes a magnetic body, and couples the first coupling surface and the second coupling surface by the coupling force f1 that is a magnetic force acting between the permanent magnets and the magnetic body.

7. The machining head according to claim 1, wherein the first coupling surface is formed in a ring shape, and the second coupling surface is formed in the ring shape.

* * * * *